United States Patent
Shirai et al.

(10) Patent No.: US 8,228,594 B2
(45) Date of Patent: Jul. 24, 2012

(54) SPATIAL LIGHT MODULATOR WITH METAL LAYERS

(75) Inventors: Akira Shirai, Tokyo (JP); Yoshihiro Maeda, Tokyo (JP); Fusao Ishii, Pittsburgh, PA (US)

(73) Assignees: Silicon Quest Kabushiki-Kaisha (JP); Olympus Corporation (JP)

(*) Notice: Subject to any disclaimer, the term of this patent is extended or adjusted under 35 U.S.C. 154(b) by 309 days.

(21) Appl. No.: 12/587,663

(22) Filed: Oct. 9, 2009

(65) Prior Publication Data

US 2010/0027101 A1 Feb. 4, 2010

Related U.S. Application Data

(63) Continuation-in-part of application No. 12/004,607, filed on Dec. 24, 2007, now Pat. No. 7,646,528, which is a continuation-in-part of application No. 11/121,543, filed on May 4, 2005, now Pat. No. 7,268,932, which is a continuation-in-part of application No. 10/698,620, filed on Nov. 1, 2003, now abandoned, and a continuation-in-part of application No. 10/699,140, filed on Nov. 1, 2003, now Pat. No. 6,862,127, and a continuation-in-part of application No. 10/699,143, filed on Nov. 1, 2003, now Pat. No. 6,903,860.

(60) Provisional application No. 61/195,870, filed on Oct. 9, 2008.

(51) Int. Cl.
*G02B 26/00* (2006.01)
*G02F 1/29* (2006.01)

(52) U.S. Cl. ......... 359/290; 359/237; 359/291; 359/318

(58) Field of Classification Search .......... 359/290–292, 359/295, 223–225, 245, 260–263, 298, 198, 359/301–303, 317–318, 237, 242
See application file for complete search history.

(56) References Cited

U.S. PATENT DOCUMENTS

| | | | |
|---|---|---|---|
| 5,526,688 A | 6/1996 | Boysel et al. | |
| 5,597,736 A | 1/1997 | Sampsell | |
| 5,719,695 A | 2/1998 | Heimbuch et al. | |
| 5,818,095 A | 10/1998 | Sampsell et al. | |
| 5,917,645 A | 6/1999 | Min et al. | |
| 6,710,443 B1 | 3/2004 | Rost et al. | |
| 6,861,277 B1 | 3/2005 | Monroe et al. | |
| 6,897,532 B1* | 5/2005 | Schwarz et al. | 257/367 |
| 7,118,959 B2 | 10/2006 | Wofford et al. | |
| 7,206,110 B2 | 4/2007 | Kelly et al. | |
| 7,230,749 B2 | 6/2007 | Martin et al. | |
| 7,304,337 B2 | 12/2007 | Inoue | |
| 2001/0006245 A1* | 7/2001 | Yunogami et al. | 257/513 |
| 2002/0057403 A1* | 5/2002 | Yasukawa et al. | 349/110 |
| 2007/0206269 A1 | 9/2007 | Martin et al. | |
| 2008/0064224 A1 | 3/2008 | Rothenbury et al. | |

* cited by examiner

*Primary Examiner* — Dawayne A Pinkney
(74) *Attorney, Agent, or Firm* — Bo-In Lin

(57) ABSTRACT

The present invention provides image projection system implemented with a spatial light modulator, for modulating an illumination light projected from a light source wherein said spatial light modulator comprising an image projection system implemented with a spatial light modulator for modulating an illumination light projected from a light source wherein said spatial light modulator comprising: at least two electrically conductive layers functioning as two different electrical wirings and said conductive layers having respectively a first and a second longitudinal directions overlapping and crossing each other; and a fixed electric potential layer electrically connected to a fixed electric potential, wherein the two different conductive layers and fixed electric potential layer overlapping one another and disposed at a location along a light path of the illumination light emitted from the light source to block said illumination light.

23 Claims, 25 Drawing Sheets

US 8,228,594 B2

SPATIAL LIGHT MODULATOR WITH METAL LAYERS

CROSS REFERENCE TO RELATED APPLICATIONS

This application is a Non-Provisional application of Application 61/195,870 and claims the Priority Date of Oct. 9, 2008. This application is also a Continuation-in Part (CIP) application of a Non-provisional application Ser. No. 12/004,607 filed on Dec. 24, 2007 now U.S. Pat. No. 7,646,528. Application Ser. No. 12/004,607 is a Continuation-in Part (CIP) application of a U.S. patent application Ser. No. 11/121,543 filed on May 4, 2005, now issued into U.S. Pat. No. 7,268,932. The application Ser. No. 11/121,543 is a Continuation in part (CIP) application of three previously filed applications. These three applications are Ser. Nos. 10/698,620 filed on Nov. 1, 2003 now abandoned; 10/699,140 filed on Nov. 1, 2003, now issued into U.S. Pat. No. 6,862,127; and 10/699,143 filed on Nov. 1, 2003 now issued into U.S. Pat. No. 6,903,860 by one of the Applicants of this patent application. The disclosures made in these patent applications are hereby incorporated by reference in this patent application.

BACKGROUND OF THE INVENTION

1. Field of the Invention

The present invention relates generally to an image projection system implemented with a spatial light modulator (SLM). Particularly, this invention relates to an image projection system implemented with a spatial light modulator (SLM) with metal layers formed in the electrical wirings to protect an active circuit from an incident light.

2. Description of the Related Art

Even though there have been significant advances made in recent years in the technologies of implementing electromechanical micromirror devices as spatial light modulators (SLM), there are still limitations and difficulties when they are employed to display high quality images. Specifically, when the display images are digitally controlled, the quality of the images is adversely affected because the images are not displayed with a sufficient number of gray scale gradations.

Electromechanical micromirror devices have drawn considerable interest because of their application as spatial light modulators (SLMs). A spatial light modulator requires an array of a relatively large number of micromirrors and each of these micromirrors are controlled for modulating and projecting a display pixel. Depending on the resolution requirements of the displayed images, the number of required micromirrors ranges from 60,000 to several million for each SLM.

Referring to FIG. 1A for a digital video system 1 includes a display screen 2 disclosed in a relevant U.S. Pat. No. 5,214,420. A light source 10 is used to generate light beams to project illumination for the display images on the display screen 2. The light 9 projected from the light source is further concentrated and directed toward lens 12 by way of mirror 11. Lenses 12, 13 and 14 form a beam columnator operative to columnate the light 9 into a column of light 8. A spatial light modulator 15 is controlled by a computer through data transmitted over data cable 18 to selectively redirect a portion of the light from path 7 toward lens 5 to display on screen 2. FIG. 1B shows a SLM 15 that has a surface 16 that includes an array of switchable reflective elements 17, 27, 37, and 47, each of these reflective elements is attached to a hinge 30. When the element 17 is in an ON position, a portion of the light from path 7 is reflected and redirected along path 6 to lens 5 where it is enlarged or spread along path 4 to impinge on the display screen 2 to form an illuminated pixel 3. When the element 17 is in an OFF position, the light is reflected away from the display screen 2 and, hence, pixel 3 is dark.

Each of the mirror elements constituting a mirror device functions as a spatial light modulator (SLM), and each mirror element comprises a mirror and electrodes. A voltage applied to the electrode(s) generates a coulomb force between the mirror and the electrode(s), making it possible to control and incline the mirror. The inclined mirror is "deflected" according to a common term used in this patent application for describing the operational condition of a mirror element.

When a mirror is deflected with a voltage applied to the electrode(s), the deflected mirror also changes the direction of the reflected light in reflecting an incident light. The direction of the reflected light is changed in accordance with the deflection angle of the mirror. The present patent application refers to the light reflected towards a projection path designated for image display as "ON light", and refers to a light reflected in a direction away from the designated projection path for image display as "OFF light". When the light reflected by the mirror to the projection path is of lesser intensity than the "ON light", because only a portion of the reflected light is directed in the ON light direction, it is referred to as "intermediate light". The present patent application defines an angle of rotation along a clockwise (CW) direction as a positive (+) angle and that of a counterclockwise (CCW) direction as a negative (−) angle. A deflection angle is defined as zero degrees (0°) when the mirror is in the initial state.

The on-and-off states of the micromirror control scheme as that implemented in the U.S. Pat. No. 5,214,420, and in most conventional display systems, impose a limitation on the quality of the display. Specifically, applying the conventional configuration of a control circuit limits the gray scale gradations produced in a conventional system (PWM between ON and OFF states) limited by the LSB (least significant bit, or the least pulse width). Due to the ON-OFF states implemented in the conventional systems, there is no way of providing a shorter pulse width than the duration represented by the LSB. The least intensity of light, which determines the gray scale, is the light reflected during the least pulse width. The limited levels of the gray scale lead to a degradation of the display image.

Specifically, FIG. 1C exemplifies, as related disclosures, a circuit diagram for controlling a micromirror according to U.S. Pat. No. 5,285,407. The control circuit includes memory cell 32. Various transistors are referred to as "M*" where "*" designates a transistor number and each transistor is an insulated gate field effect transistor. Transistors M5, and M7 are p-channel transistors; transistors, M6, M8, and M9 are n-channel transistors. The capacitances, C1 and C2, represent the capacitive loads in the memory cell 32. The memory cell 32 includes an access switch transistor M9 and a latch 32a based on a Static Random Access switch Memory (SRAM) design. All access transistors M9 on a Row line receive a DATA signal from a different Bit-line 31a. The particular memory cell 32 is accessed for writing a bit to the cell by turning on the appropriate row select transistor M9, using the ROW signal functioning as a Word-line. Latch 32a consists of two cross-coupled inverters, M5/M6 and M7/M8, which permit two stable states, including a state 1 when Node A is high and Node B is low and a state 2 when Node A is low and Node B is high.

FIG. 1A shows the operations of the switching between the dual states, as illustrated by the control circuit, to position the micromirrors in an ON or an OFF angular orientation. The brightness, i.e., the gray scales of a digitally controlled image system is determined by the length of time the micromirror stays in an ON position. The length of time a micromirror is in an ON position is controlled by a multiple bit word.

If each pixel is equipped with SRAM and is configured to perform the ON/OFF control for the pixel in synch with the bias driving of the micromirror as described for FIG. 1C above, the following technical problem is anticipated.

That is, the characteristics of the MOS transistor and semiconductor memory can possibly be varied by being irradiated with light. Therefore, if an incident light to be modulated enters the circuit structure, which is equipped inside the substrate and which is used for controlling a mirror, in a spatial light modulator operating while receiving relatively intense light, a malfunction will be caused.

Accordingly, the reference patent documents listed and numbered below, patents 4, 5, 6, 7 and 8 have disclosed countermeasures to prevent light from being irradiated onto the substrate of a spatial light modulator. However, these techniques, which all involve adding some kind of structure to the inside of the substrate, are faced with a technical problem that the internal structure of the spatial light modulator becomes more complex.

[Patent document 1]: U.S. Pat. No. 5,214,420
[Patent document 2]: U.S. Pat. No. 5,285,407
[Patent document 3]: U.S. Pat. No. 5,083,857
[Patent document 4]: U.S. Pat. No. 5,818,095
[Patent document 5]: U.S. Pat. No. 7,206,110
[Patent document 6]: U.S. Pat. No. 7,230,749
[Patent document 7]: U.S. Pat. No. 7,304,337
[Patent document 8]: US Patent Application 20070206269

SUMMARY OF THE INVENTION

One aspect of the present invention is to disclose a technique to improve the reliability in the operation of a spatial light modulator by securely protecting the circuit of a substrate from an incident light without influencing the operation of the spatial light modulator without a requirement to use a specific layer for shielding light in order to protect the substrate from the incident light.

The present invention discloses a spatial light modulator implemented with DRAM instead of SRAM. The DRAM requires a smaller number of transistors. The present invention further discloses an improved configuration to achieve improvements of pixel size and circuit configuration, the withstanding voltage of a transistor, the kind and sizes of capacitors, the wiring method of control wires, and the layout.

A first embodiment of the present invention provides an image projection system implemented with a spatial light modulator for modulating an illumination light projected from a light source wherein said spatial light modulator comprising: at least two electrically conductive layers functioning as two different electrical wirings and said conductive layers having respectively a first and a second longitudinal directions overlapping and crossing each other; and a fixed electric potential layer electrically connected to a fixed electric potential, wherein the two different conductive layers and fixed electric potential layer overlapping one another and disposed at a location along a light path of the illumination light emitted from the light source to block said illumination light.

A second embodiment of the present invention provides the image projection system according to the first embodiment, wherein the electrically conductive layers and fixed electric potential layer each having a layer width to overlap with one another.

A third embodiment of the present invention provides the image projection system according to the first embodiment, wherein the electrically conductive layers and fixed electric potential layer each having a layer width to overlap with one another.

A fourth embodiment of the present invention provides the image projection system according to the first embodiment, wherein one of the electrically conductive layers constituting one of said electrical wiring having a width to function as a word line.

A fifth embodiment of the present invention provides the image projection system according to the first embodiment, wherein one of the electrically conductive layers constituting one of said electrical wirings having a width to function as a bit line.

A sixth embodiment of the present invention provides the image projection system according to the first embodiment, wherein the spatial light modulator is located at a position to receive the illumination light projected from the light source with an incidence angle larger than zero (0) degrees.

A seventh embodiment of the present invention provides the image projection system according to the first embodiment, wherein the spatial light modulator is located at a position to receive the illumination light projected from the light source with an incidence angle smaller than thirty (30) degrees.

An eighth embodiment of the present invention provides the image projection system according to the first embodiment, wherein one of the electrically conductive layers functioning as a conductive plate of a capacitor.

A ninth embodiment of the present invention provides the image projection system according to the first embodiment, wherein at least one of the electrically conductive layers is connected to a fixed electric potential.

A tenth embodiment of the present invention provides the image projection system according to the first embodiment, the fixed electric potential layer is connected to a device ground potential.

An eleventh embodiment of the present invention provides the image projection system according to the first embodiment, wherein the spatial light modulator further comprises a mirror device comprising a deflectable mirror supported by a hinge to reflect the illumination light emitted from the light source.

A twelfth embodiment of the present invention provides the image projection system according to the eleventh embodiment, wherein the light source projecting the illumination light to said spatial light modulator with an incidence angle approximately two times of a maximum deflectable angle of the mirror.

A thirteenth embodiment of the present invention provides an image projection system implemented with a spatial light modulator for modulating an illumination light projected from a light source wherein said spatial light modulator comprising: at least two electrically conductive layers functioning as two different electrical wirings and said conductive layers having respectively a first and a second longitudinal directions overlapping and crossing each other; and one of the two different electrically conductive layers functioning as a conductive plate of a capacitor and the two different electrically conductive layers are overlapped with one another.

A fourteenth embodiment of the present invention provides image projection system according to the thirteenth embodiment, wherein one of the two different electrically conductive layers has a width to function as a word line.

A fifteenth embodiment of the present invention provides the image projection system according to the thirteenth embodiment, wherein one of the two different electrically conductive layers has a width to function as a bit line.

A sixteenth embodiment of the present invention provides the image projection system according to the thirteenth embodiment, wherein at least one of the electrically conductive layers is connected to a fixed electric potential.

A seventeenth embodiment of the present invention provides the image projection system according to the thirteenth embodiment, wherein at least one of the two conductively layers is connected to a device ground potential.

An eighteenth embodiment of the present invention provides the image projection system according to the thirteenth embodiment, wherein the capacitor has a metal-insulator-metal (MIM) structure further includes an insulation film disposed immediately next to one of the two electrically conductive layers.

A nineteenth embodiment of the present invention provides the image projection system according to the thirteenth embodiment, wherein said one of the two different electrically conductive layers functioning as said conductive plate of a capacitor is disposed at a lower portion of the capacitor.

A twentieth embodiment of the present invention provides the image projection system according to the thirteenth embodiment, wherein said one of the two different electrically conductive layers functioning as said conductive plate of a capacitor is disposed at a upper portion of the capacitor.

A twenty-first embodiment of the present invention provides the image projection system according to the eighteenth embodiment, wherein the insulation film of the capacitor is further composed of a tantalum pentoxide ($Ta_2O_5$).

A twenty-second embodiment of the present invention provides the image projection system according to the eighteenth embodiment, wherein the insulation film of the capacitor is further composed of a zirconium dioxide ($ZrO_2$).

A twenty-third embodiment of the present invention provides the image projection system according to the eighteenth embodiment, wherein the insulation film of the capacitor further comprises a layered film of a first layer of a tantalum pentoxide ($Ta_2O_5$) and a second layer of a niobium pentoxide ($Nb_2O_5$).

The present invention eliminates a need to use a specific layer for shielding light in order to protect the substrate from an incident light, reduces an influence on the stray capacitance because there is a minimum change in the wiring in a plurality of layers and therefore reduces an influence on the operation of the spatial light modulator. Further, the present invention maintains the wiring widths of the word line and bit line, both of which are influenced by a stray capacitance, and therefore no anomalies occur in the operation of the spatial light modulator.

BRIEF DESCRIPTION OF THE DRAWINGS

The present invention is described in detail below with reference to the following Figures.

DESCRIPTION OF THE PREFERRED EMBODIMENTS

The following is a description, in detail, of the preferred embodiment of the present invention with reference to the accompanying drawings.

Figure 1A:
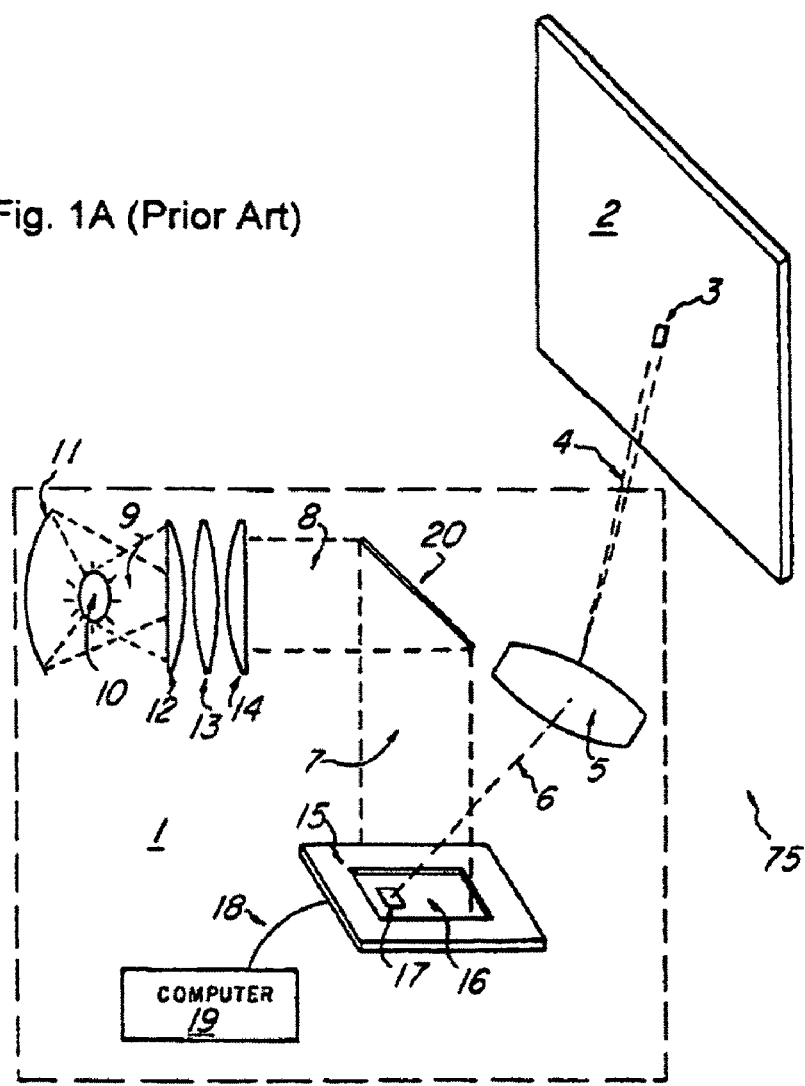
FIG. 1A illustrates the basic principle of a projection display using a micromirror device, as disclosed in a prior art patent.
Figure 1B:
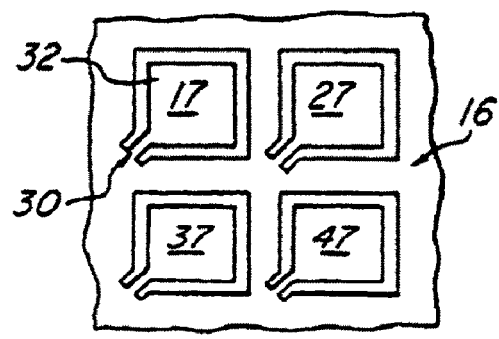
FIG. 1B is a top view diagram showing the configuration of mirror elements of a portion of a micromirror array of a projection apparatus disclosed in a prior art patent.
Figure 1C:
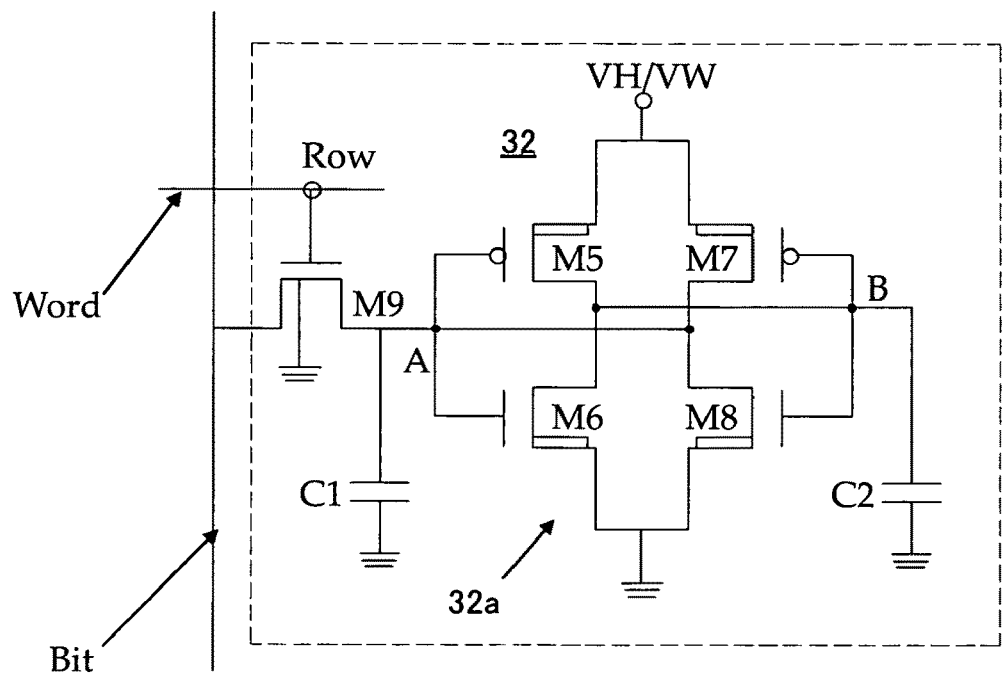
FIG. 1C is a circuit diagram showing the configuration of a drive circuit of mirror elements of a projection apparatus disclosed in a prior art patent.
Figure 2:
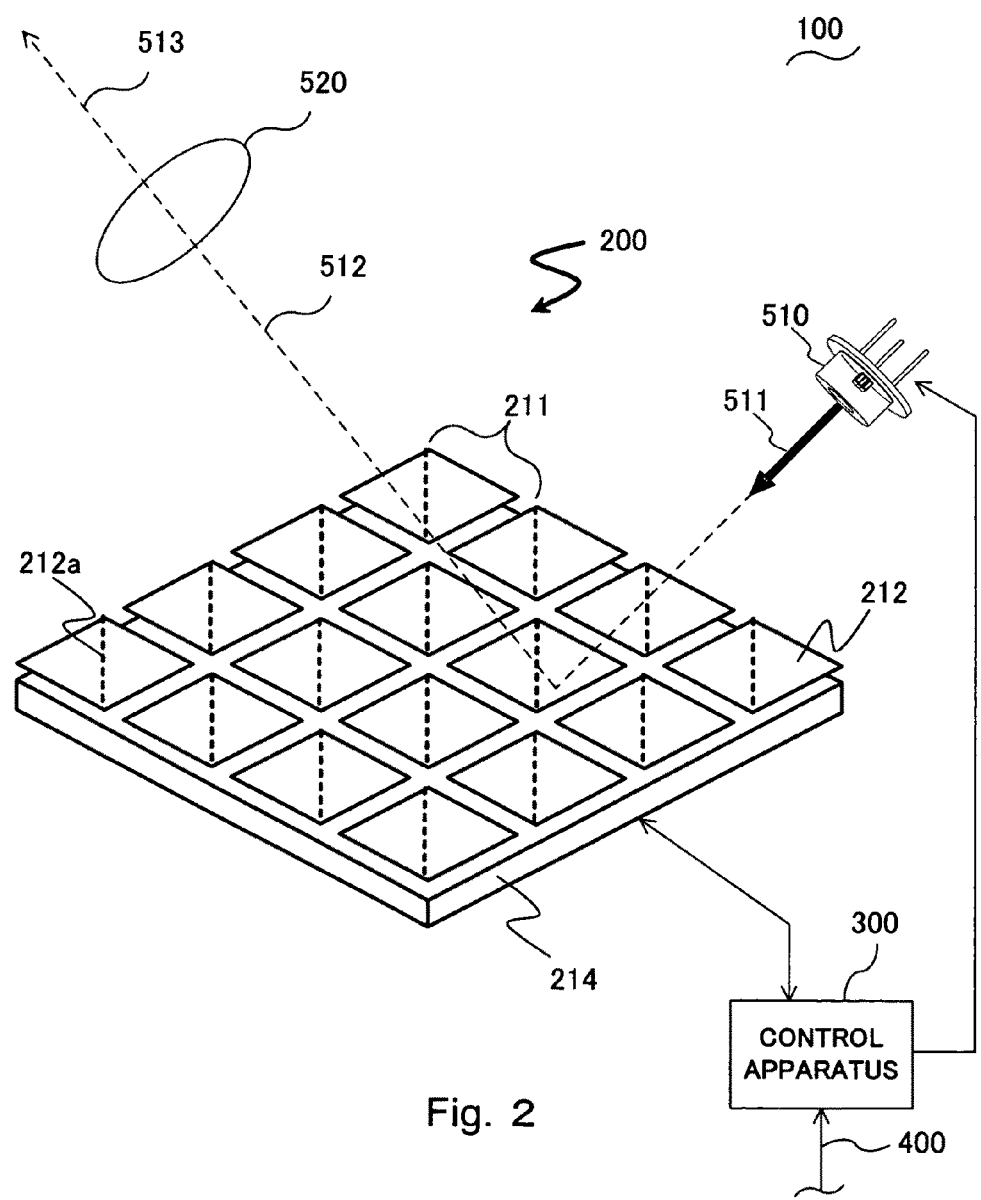
FIG. 2 is a diagonal view diagram showing a part of the configuration of a pixel unit constituting the pixel array of a spatial light modulator according to a preferred embodiment of the present invention.

FIG. 2 is a diagonal view diagram showing the case of incorporating a mirror device, which is a preferred embodiment of the present invention, into a projection apparatus as a spatial light modulator.

The projection apparatus 100 is implemented with a spatial light modulator 200 according to the present invention that comprises a control apparatus 300, a light source 510 and a projection optical system 520.

As shown in FIG. 2, the spatial light modulator 200 includes a plurality of pixel units 211, each comprises an address electrode (not shown in a drawing herein), an elastic hinge (not shown in a drawing herein) and a mirror 212 supported on the elastic hinge. The pixel elements are arranged as a two-dimensional array on a substrate 214. The configuration shown in FIG. 2 is obtained by arraying a plurality of pixel units 211, each of which comprises a square mirror 212 in regular intervals on the substrate 214.

The mirror 212 of one pixel unit 211 is controlled by applying a voltage to an address electrode or address electrodes placed on the substrate 214.

Further, the pitch (i.e., the pixel array pitch) between adjacent mirrors 212 is preferred to be any size between 4 μm and 14 μm, or more preferably any size between 5 μm and 10 μm, in consideration of the number of pixels required for various levels from a 2048×4096 super high definition television (super HD TV), or the like, to a non-full HD TV, and of the size of a mirror device. Here, the "pitch" is the distance between the respective deflection axes of adjacent mirrors 212.

Specifically, the area size of the mirror 212 can be made any size between 16 μm$^2$ and 196 μm$^2$, or more preferably any size between 25 μm$^2$ and 100 μm$^2$.

Note that the form of the mirror 212 or the pitch between the mirrors 212 is not limited as such.

Further, the figure indicates the deflection axis 212a, about which a mirror 212 is deflected, using a dotted line. The light emitted from the light source 510 possessing a coherent characteristic is made to enter the mirror 212 so as to be in the orthogonal or diagonal direction (e.g., the range between 0 and 30 degrees) in relation to the deflection axis 212a. The light source 510 possessing a coherent characteristic is, for example, a laser light source.

The following provides a description of the comprisal and operation of one pixel unit 211 with reference to the cross-sectional diagram thereof of the spatial light modulator 200 shown in FIG. 2.

Figure 3:
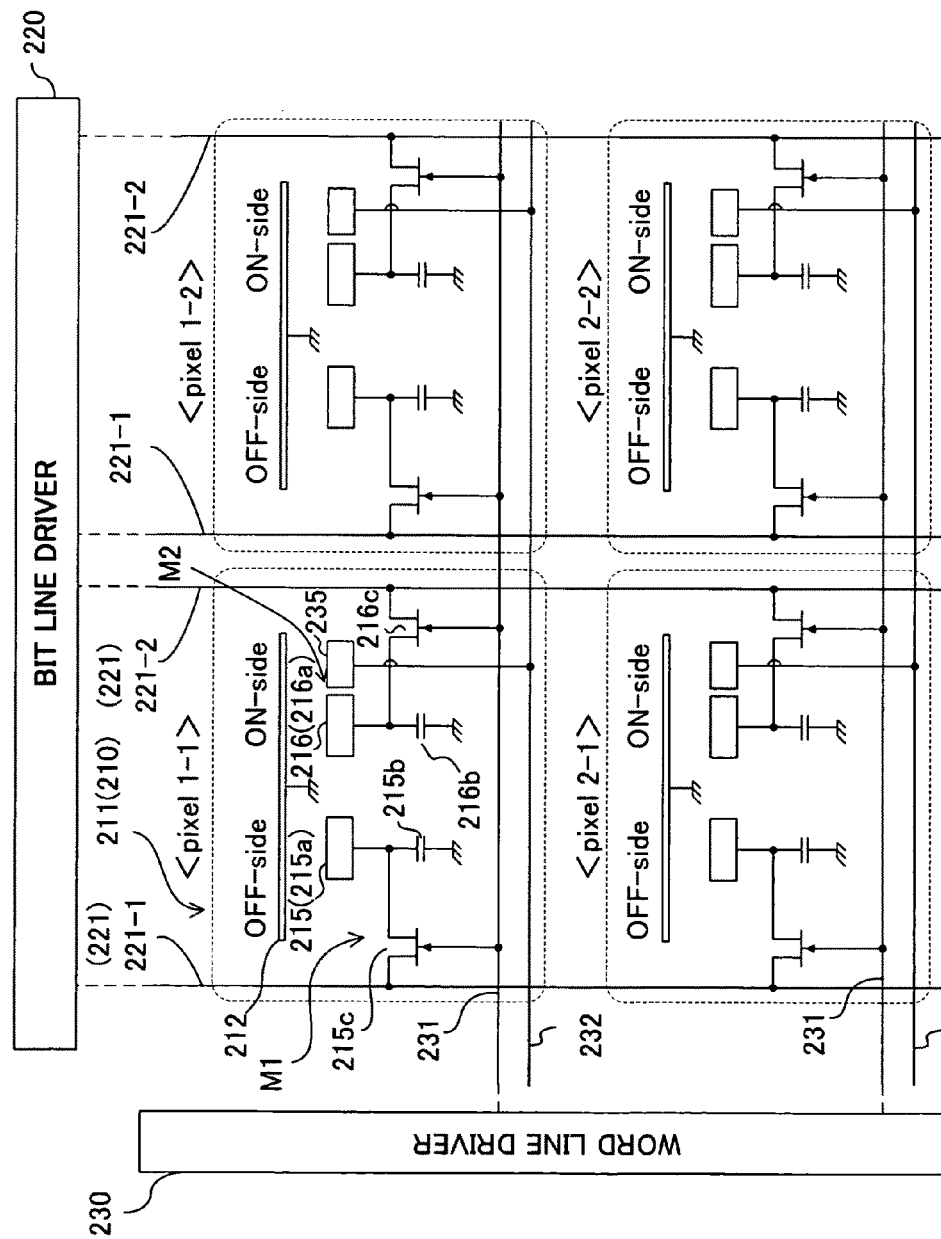
FIG. 3 is a functional circuit diagram showing an exemplary configuration of a pixel unit constituting the pixel array of a spatial light modulator according to a preferred embodiment of the present invention.

FIG. 3 is a conceptual diagram showing the internal configuration of the spatial light modulator 200 shown in FIG. 2.

As exemplified in FIG. 3, the spatial light modulator 200 according to the present embodiment comprises a pixel array 210, a bit line driver unit 220 and a word line driver unit 230.

In the pixel array 210, a plurality of pixel units 211 is arrayed in a grid-like fashion at each of the positions where bit lines 221 extending vertically from the bit line driver unit 220 and word lines 231 extending horizontally from the word line driver unit 230 cross one another.

As exemplified in FIG. 3, each pixel unit 211 comprises a mirror 212 that is supported so as to be freely tiltable on the substrate 214 by way of a hinge 213.

An OFF electrode 215 and an OFF stopper 215a are placed symmetrically across the hinge 213 that comprises a hinge electrode 213a on the substrate 214, and likewise an ON electrode 216 and an ON stopper 216a are placed thereon.

The OFF electrode 215, when a predetermined voltage is applied thereto, attracts the mirror 212 with a Coulomb force to tilt it to a position abutting on the OFF stopper 215a. This causes the incident light 511 incident to the mirror 212 to be reflected to the light path of an OFF position that is shifted from the optical axis of the projection optical system 130.

The ON electrode 216, when a predetermined voltage is applied thereto, attracts the mirror 212 with a Coulomb force to tilt it to a position abutting on the ON stopper 216a. This causes the incident light 511 incident to the mirror 212 to be reflected to the light path of an ON position that matches the optical axis of the projection optical system 130.

An OFF capacitor 215b is connected to the OFF electrode 215 and to the bit line 221-1 by way of a gate transistor 215c that is constituted by a field effect transistor (FET) and the like.

Further, an ON capacitor 216b is connected to the ON electrode 216, and to the bit line 221-2 by way of a gate transistor 216c that is constituted by a field effect transistor (FET) and the like.

The opening and closing of the gate transistor 215c and gate transistor 216c are controlled through the word line 231.

That is, a horizontal one row of the pixel units 211 in line with an arbitrary word line 231 are simultaneously selected, and the charging and discharging of capacitance to and from the OFF capacitor 215b and ON capacitor 216b are controlled by the bit line driver unit 220 and word line driver unit 230 through the bit lines 221-1 and 221-2, and thereby the individual ON/OFF controls of the mirrors 212 in the respective pixel units 211 within the present one horizontal row are carried out.

In other words, the OFF capacitor 215b and gate transistor 215c on the side where the OFF electrode 215 is placed constitute a memory cell M1 that is so called a DRAM structure.

Likewise, the ON capacitor 216b and gate transistor 216c on the side where the ON electrode 216 is placed constitute a DRAM-structured memory cell M2.

With this configuration, the tilting operation of the mirror 212 is controlled in accordance with the presence and absence of data written to the respective memory cells of the OFF electrode 215 and ON electrode 216.

The light source 510 illuminates the spatial light modulator 200 with the incident light 511 which is reflected by the individual mirrors 212 as a reflection light 512, of which the reflection light 512 in the light path passing through a projection optical system 520 is projected onto a screen (not shown in a drawing herein) or such, as a projection light 513.

A control apparatus 300 according to the present embodiment controlling the spatial light modulator 200 uses, for example, the ON/OFF states (i.e., an ON/OFF modulation) and oscillating state (i.e., an oscillation modulation) of the mirror 212 of the spatial light modulator 200 as described later, thereby attaining an intermediate gray scale.

Furthermore, the present preferred embodiment 1 is configured such that each ROW line is equipped with a modified plate line 232 (PL-n, where "n" is the number of ROW lines) and such that a second ON electrode 235 (i.e., an electrode D) placed near to the ON electrode 216 is connected to the modified plate line 232.

The present embodiment is configured such that, in each pixel unit 211 constituting the pixel array 210, the memory cell used for controlling the mirror 212 has a simple DRAM structure requiring merely one transistor, and therefore an increase in the size of the memory cell structure can be limited to a minimum even though the modified plate line 232 and second ON electrode 235 are added. Therefore, it is easy to make a high definition device while arraying a larger number of pixel units 211 in a pixel array 210 of a certain size.

Further, with addition of the modified plate line 232 and second ON electrode 235, it is possible to control the mirror 212 in various manners of tilting, greatly extending a gray scale representation, as described later, compared with the case of comprising only the OFF electrode 215 and ON electrode 216.

In other words, it is possible to accomplish both the high definition and high level of gray scale representation of a projection image in a projection technique using a spatial light modulator such as the spatial light modulator 200.

Next, the following is a description of a specific example of incorporating the above described spatial light modulator 200 as a device.

In this case, the disclosed configurations of the memory cells M1 and M2 use metal-insulator-metal (MIM) capacitors as the OFF capacitor 215b and ON capacitor 216b.

Note that a plate used for an MIM capacitor may use a metal such as aluminum. Such selection of a material, however, is arbitrary.

FIGS. 4A, 4B, 4C, 4D and 4E together show an exemplary circuit layout, in different heights, of each pixel unit of the spatial light modulator 200 exemplified in the above described FIG. 3.

Figure 4A:
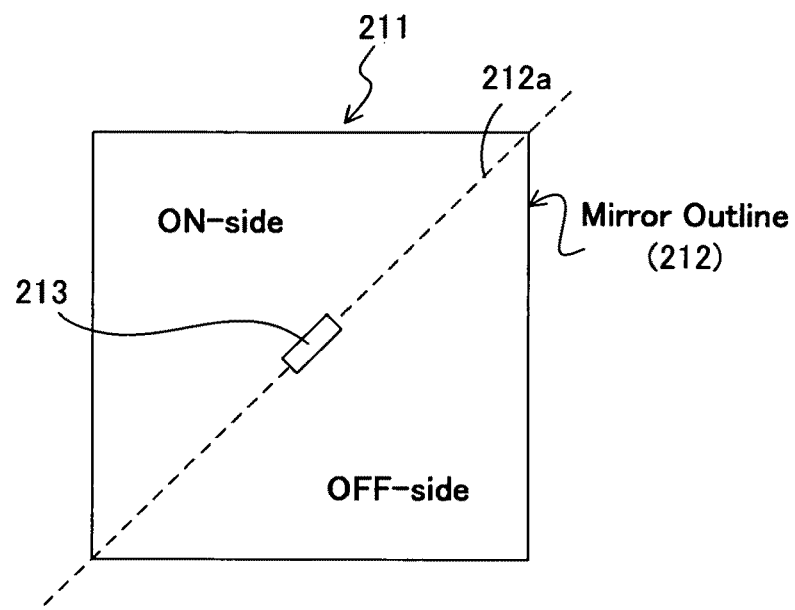
FIG. 4A is a top view diagram showing a circuit layout, in a different height, of each pixel unit of a spatial light modulator according to a preferred embodiment of the present invention.

That is, FIG. 4A shows the horizontal section of a part of the hinge 213 of the pixel unit 211, in which the hinge 213 is placed such that the longitudinal direction of the rectangular section of the hinge 213 matches the direction of the deflection axis 212a.

Further, the mirror 212 supported by the hinge 213 tilts (i.e., deflects) in the direction of ON-side and OFF-side dividing the rectangular area of the pixel unit 211 into two parts along the diagonal line of the mirror 212, thereby modulating the incident light 511.

Figure 4B:
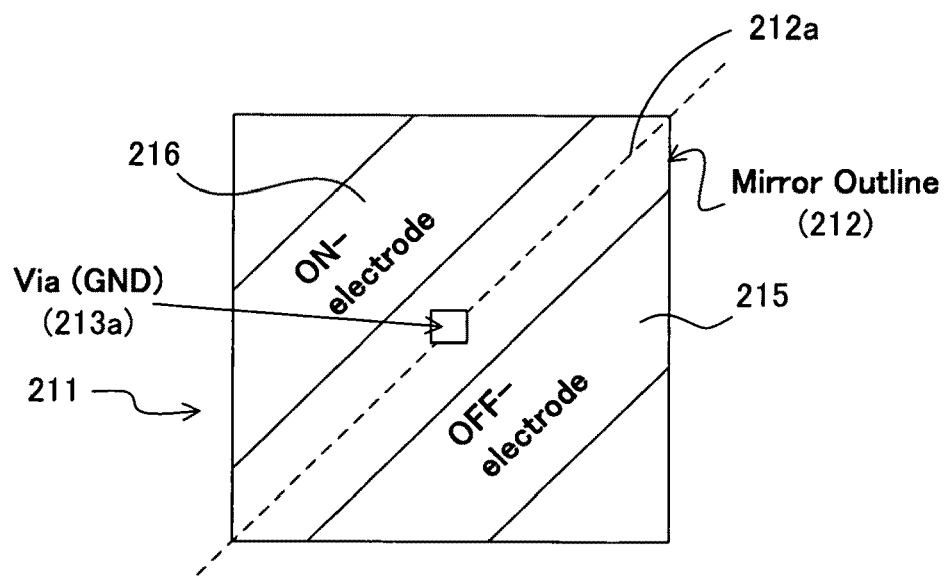
FIG. 4B is a top view diagram showing a circuit layout, in a different height, of each pixel unit of a spatial light modulator according to a preferred embodiment of the present invention.

FIG. 4B exemplifies the circuit layout on a horizontal section on the layout height of the OFF electrode 215 and ON electrode 216, the height which is lower than that of FIG. 4A.

The hinge electrode 213a connected to the hinge 213 is placed at the position immediately under the present hinge 213, and further, conductor patterns which will constitute the OFF electrode 215 and ON electrode 216 are symmetrically placed sandwiching the hinge electrode 213a (which is also the deflection axis 212a).

Figure 4C:
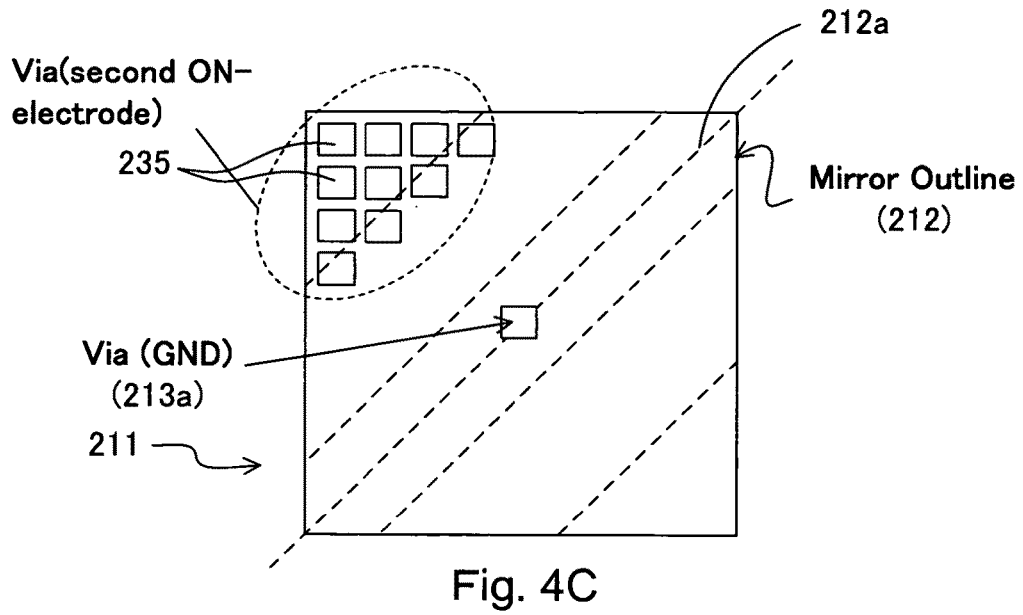
FIG. 4C is a top view diagram showing a circuit layout, in a different height, of each pixel unit of a spatial light modulator according to a preferred embodiment of the present invention.

FIG. 4C exemplifies the circuit layout on a horizontal section on the layout height of the second ON electrode 235, the height which is lower than that of FIG. 4B.

The second ON electrode 235 and grounding Via hole filler conductor 238 are respectively placed at the corner parts sandwiching the hinge electrode 213a (and the deflection axis 212a) at the center and positioning on the outside of the ON electrode 216 and OFF electrode 215.

Note that the reason why the grounding Via hole filler conductor 238 is symmetrically placed with the second ON electrode 235 is, for example, to maintain a feature balance with the Via hole of the second ON electrode 235 in order to improve the flatness when a thin film is deposited in the production process.

As exemplified in FIGS. 4B and 4C, the second ON electrode 235 is placed in a layer (i.e., the wiring layer) that is different from the layer in which the ON electrode 216 is placed, and both electrodes are overlapped with each other.

If the second ON electrode 235 and ON electrode 216 are placed in the same layer, the gap between the electrodes needs to be increased, and therefore the electrode area sizes will be reduced. The placing of the electrodes in different layers as the present embodiment is configured makes it possible to increase the respective area sizes of these electrodes.

Further, the overlapping of the second ON electrode 235 and ON electrode 216 with each other makes it possible to secure the respective necessary area sizes of the second ON electrode 235 and ON electrode 216 even if a positional shift(s) is generated during the production process.

Further, when the mirror 212 tilts, it abuts on the ON electrode 216, not on the second ON electrode 235. This is exactly the reason why a stopper is preferred to be equipped inside the mirror contour, and because of this, the height of the second ON electrode 235 is preferred to be less than that of the ON electrode 216. The ON electrode 216 being higher increases a Coulomb force functioning therefrom, contributing to decreasing a voltage to be applied thereto.

Meanwhile, the second ON electrode 235 is formed by a plurality of Via hole filler conductors. The modified plate line 232 to which the Via hole filler conductor of the second ON electrode 235 is connected is in lower layer than the layer in which the Via hole filler conductor is formed in accordance with the view point of the mirror 212.

The placement of the second ON electrode 235 as the Via hole filler conductors shortens the distance between the present electrode 235 and mirror 212, thereby improving the controllability, than in a case in which the area size of the plate line 232 is enlarged to make it the electrode for controlling the mirror 212.

Figure 4D:
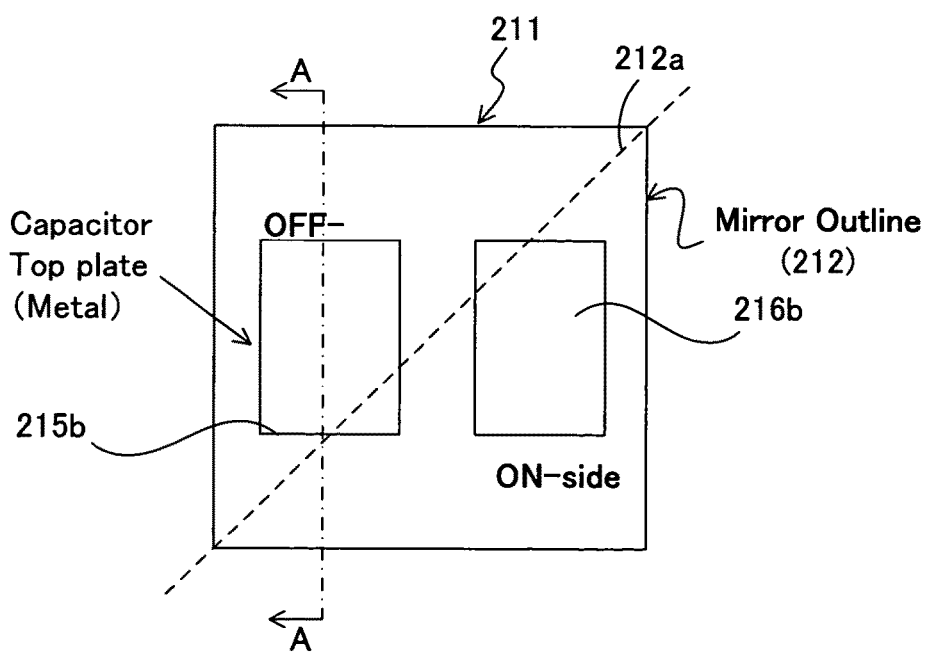
FIG. 4D is a top view diagram showing a circuit layout, in a different height, of each pixel unit of a spatial light modulator according to a preferred embodiment of the present invention.

FIG. 4D shows the layout, in the horizontal section, at the height of the upper capacitor plate of the ON capacitor 216b and the height of the gate transistor 215c.

The present embodiment is configured to place the OFF capacitor 215b and ON capacitor 216b straddling the deflection axis 212a of the pixel unit 211 in the diagonal direction.

Figure 4E:
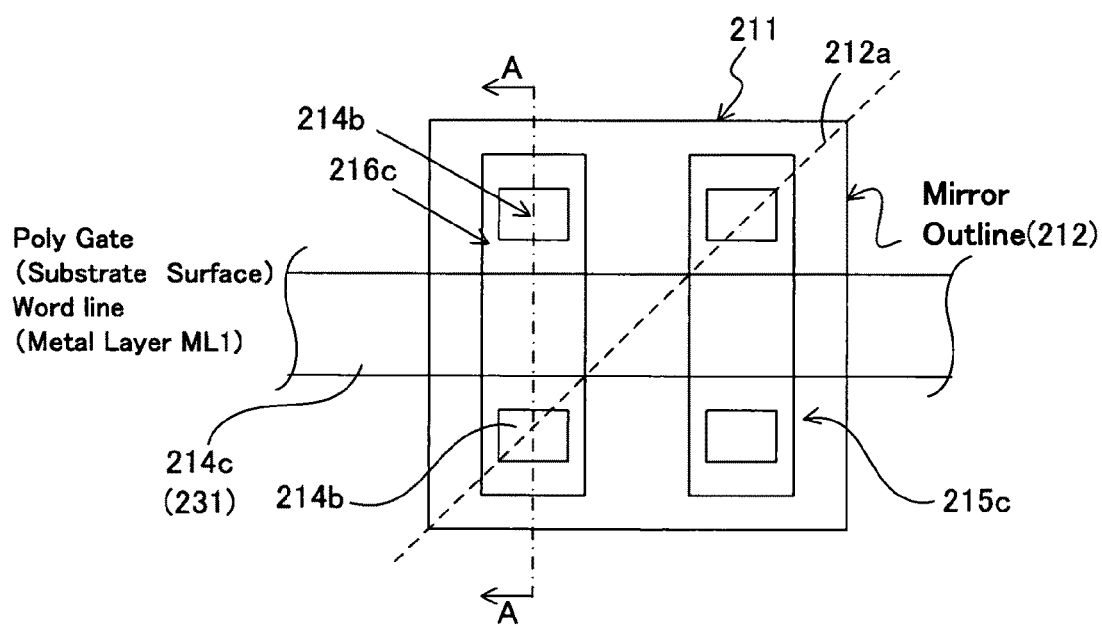
FIG. 4E is a top view diagram showing a circuit layout, in a different height, of each pixel unit of a spatial light modulator according to a preferred embodiment of the present invention.

FIG. 4E shows the layout, in the horizontal section, at the height where the gate transistor 215c and gate transistor 216c are placed, the height that is lower than the FIG. 4D.

The gate transistor 215c and gate transistor 216c are placed parallel to each other along the direction of placing the word line 231 at the center.

As exemplified in FIGS. 4D and 4E, the gate transistor 215c and OFF capacitor 215b are placed straddling the deflection axis 212a of the mirror 212, and so are the gate transistor 216c and ON capacitor 216b.

The source (i.e., the N-well 214b) of the gate transistor 215c (or gate transistor 216c) and the upper capacitor plate 216b-2 of the OFF capacitor 215b (or ON capacitor 216b) become an electric potential (simply noted as "potential" hereinafter) for controlling the mirror 212, and therefore a transistor and a capacitor are preferred to be placed on a side corresponding to the tilting direction of the mirror 212 as close as possible.

Further, the present embodiment is also configured to wire a poly-silicon gate electrode 214c and word line 231 mutually parallel and overlapped with each other as exemplified in FIG. 4E.

As such, the present embodiment is configured to wire the word line 231 in parallel and overlapped with the poly-silicon gate electrode 214c, in a first layer metal wiring layer ML1, relative to the poly-silicon gate electrode 214c which is placed linearly in the ROW direction, in order to reduce the resistance and stray capacitance of the word line 231 and improve the drive speed of the ROW line.

Figure 5:
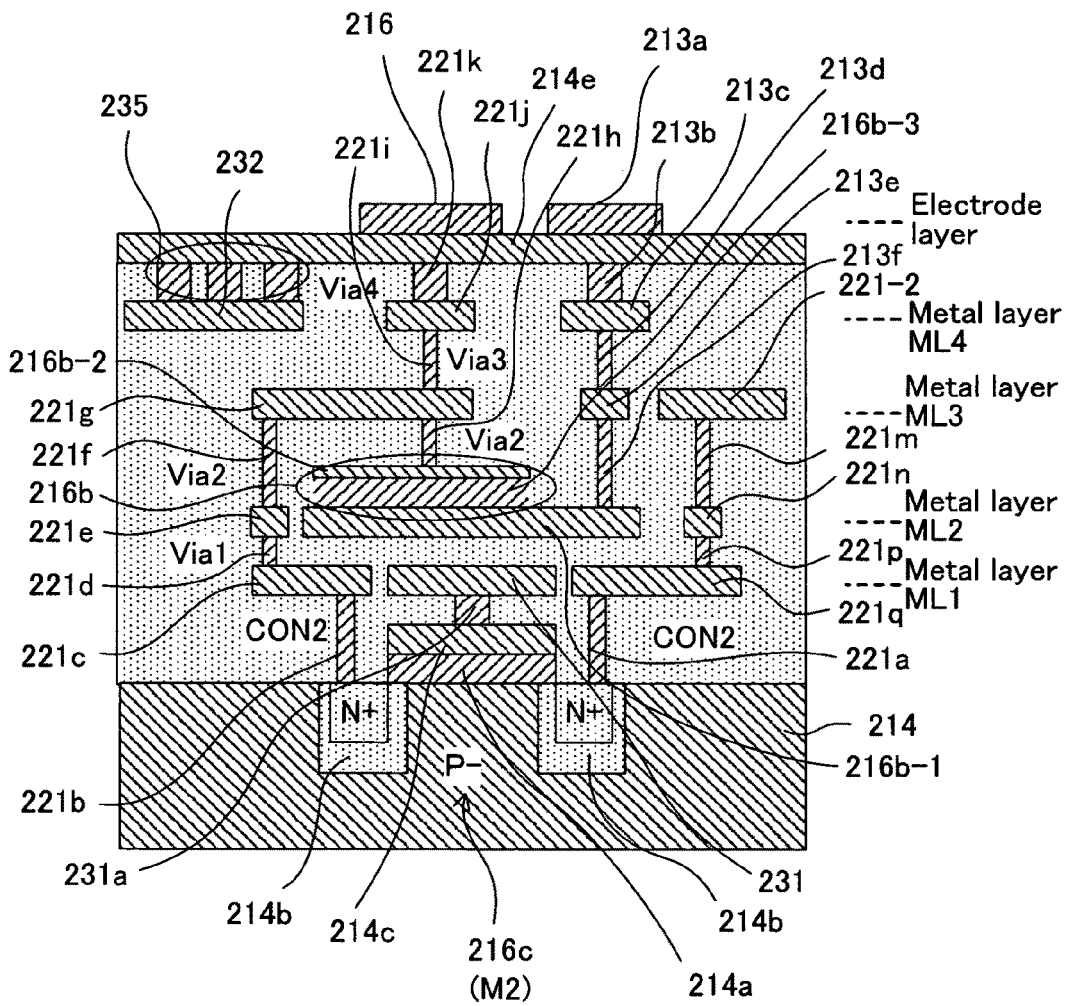
FIG. 5 is a cross-sectional diagram of the part along the line A-A shown in FIGS. 4D and 4E.

FIG. 5 is a cross-sectional diagram of the part along the line A-A as indicated in FIGS. 4D and 4E, that is, a cross-sectional diagram of the part of the gate transistor 216c provided for controlling the ON electrode 216.

Introducing an N-type impurity with a field oxidized film (FOX) formed on the principal surface of a substrate 214 made of, for example, a P-type semiconductor used as a mask forms a pair of N-wells 214b; then selectively having the field oxidized film between the pair of N-wells 214b remain forms a gate oxidized film 214a; and placing the poly-silicon gate electrode 214c on and along the formed gate oxidized film 214a, thereby the gate transistor 216c is formed.

The present embodiment is also configured to deposit four metal layers, i.e., the first layer metal wiring layer ML1 through fourth layer metal wiring layer ML4, with insulation layers 214d intervening between the respective adjacent layers, thereby forming various wirings (which are described later).

Note that the insulation layers 214d are actually sequentially deposited between the respective adjacent wiring layers; the borders on which the insulation layer 214d is deposited is not depicted in the figure for easy comprehension thereof.

In this case, the word line 231 is placed in approximately the same width as that of the poly-silicon gate electrode 214c by using the first layer metal wiring layer ML1 right above the poly-silicon gate electrode 214c, with the word line 231 connected to the poly-silicon gate electrode 214c through a contact hole filler conductor 231a.

A flat conductor pattern 221c and conductor pattern 221q are formed in the first layer metal wiring layer ML1 that is at the same height as the word line 231 is.

The conductor pattern 221q, on the lower side thereof, is connected to one N-well 214b of the gate transistor 216c by way of a contact hole filler conductor 221a.

Meanwhile, the conductor pattern 221q, on the upper side thereof, is connected to the bit line 221-2 equipped in the third layer metal wiring layer ML3 by way of Via hole filler conductor 221p, conductor pattern 221n (i.e., the second layer metal wiring layer ML2) and Via hole filler conductor 221m.

The other N-well 214b of the gate transistor 216c is connected to the upper capacitor plate 216b-2 of the ON capacitor 216b by way of the contact hole filler conductor 221b, flat conductor pattern 221c, Via hole filler conductor 221d, conductor pattern 221e (i.e., the second layer metal wiring layer ML2), Via hole filler conductor 221f, conductor pattern 221g (i.e., the third layer metal wiring layer ML3) and Via hole filler conductor 221h.

A lower capacitor plate 216b-1 that is formed as the second layer metal wiring layer ML2 simultaneously with the conductor pattern 221e and conductor pattern 221n is placed oppositely to the upper capacitor plate 216b-2, with a capacitor insulation film 216b-3 intervening between the aforementioned two plates, and thus the two plates form the ON capacitor 216b.

The capacitor insulation film 216b-3 is made of, for example, tantalum pentoxide ($Ta_2O_5$) or zirconium dioxide ($ZrO_2$), or consists of a layered film constituted by a film made of tantalum pentoxide ($Ta_2O_5$) and that made of niobium pentoxide ($Nb_2O_5$).

With this configuration, charging the ON capacitor 216bc from the bit line 221-2 is controlled by the ON/OFF operation of the gate transistor 216c that is controlled through the word line 231.

The upper capacitor plate 216b-2 is connected to the ON electrode 216 by way of the Via hole filler conductor 221h, conductor pattern 221g, Via hole filler conductor 221i, conductor pattern 221j and Via hole filler conductor 221k.

The lower capacitor plate 216b-1 of the ON capacitor 216b is connected to the hinge electrode 213a by way of the Via hole filler conductor 213f, conductor pattern 213e, the Via hole filler conductor 213d, conductor pattern 213c and Via hole filler conductor 213b.

Furthermore, the modified plate line 232 is formed in the fourth layer metal wiring layer ML4, and the second ON electrode 235 is formed on the modified plate line 232 by using the conductor deposited in the Via hole.

Furthermore, the entire top surface of the second ON electrode 235 is covered with an insulation film 214e functioning as etching stopper, and the ON electrode 216, hinge electrode 213a and further an OFF electrode 215 (which is described later) are placed on the insulation film 214e.

Figure 6:
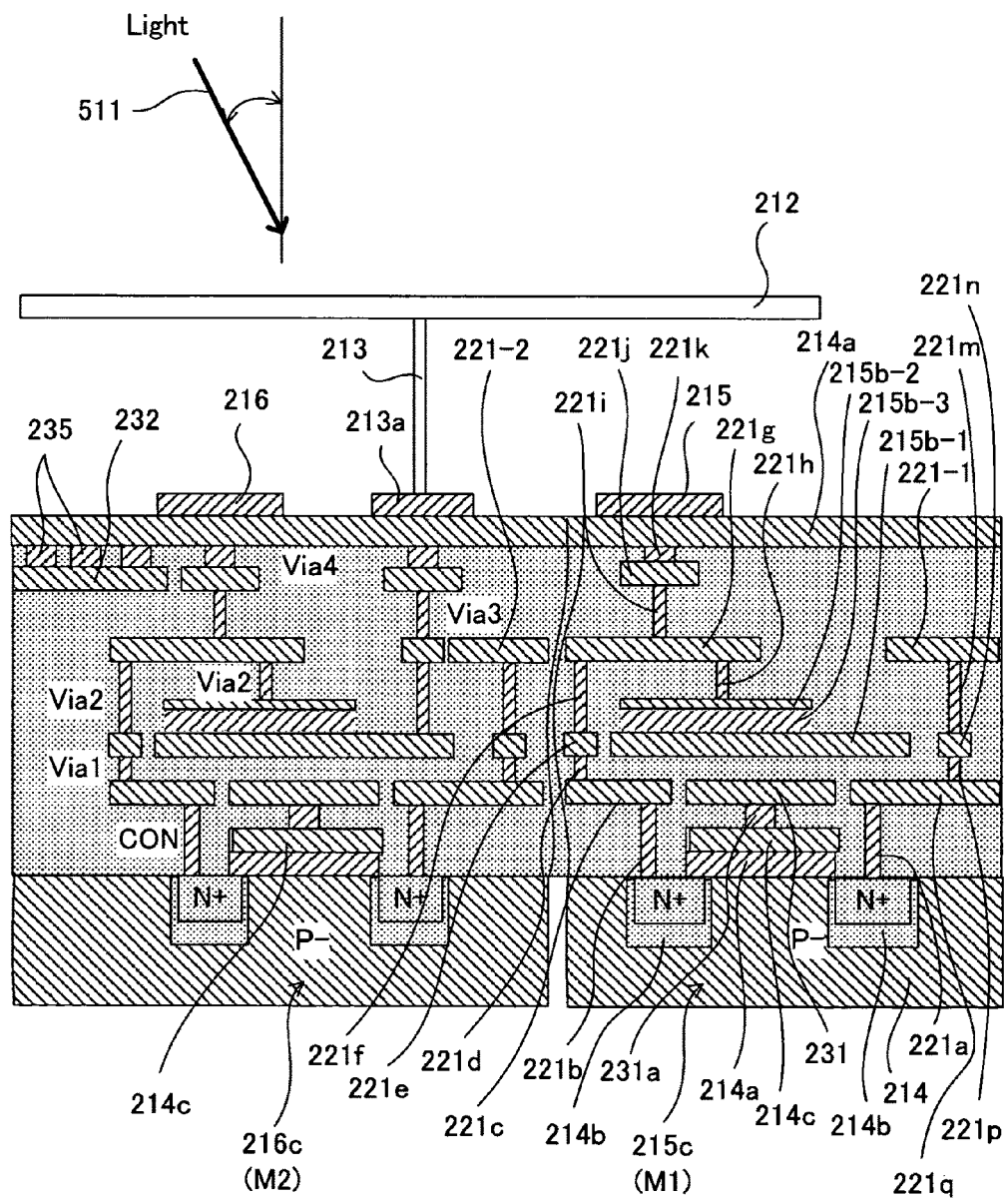
FIG. 6 is a partial cross-sectional diagram of one pixel of a spatial light modulator according to a preferred embodiment of the present invention.

FIG. 6 is a cross-sectional diagram showing the connecting relationship in the first layer metal wiring layer ML1 through fourth layer metal wiring layer ML4 for one pixel unit 211 that comprises the mirror 212, OFF electrode 215 on the OFF side, gate transistor 215c and OFF capacitor 215b (constituting the memory cell M1).

Referring to FIG. 6, the configuration of the memory cell M2 related to the ON electrode 216 on the left side is as described for the above FIG. 5, while the memory cell M1 related to the OFF electrode 215 on the right side is approximately the same as the memory cell M1 also shown in FIG. 5. Therefore, the same component sign symbol is assigned to the corresponding same constituent component.

FIG. 6 shows the memory cells M1 and M2 side by side on the left and right sides for convenience of depiction; actually, however, they are placed so as to overlap with each other in the direction orthogonal to the face of the paper (i.e., the longitudinal direction of the word line 231).

The OFF capacitor 215b, which is constituted by lower capacitor plate 215b-1, upper capacitor plate 215b-2 and capacitor insulation film 215b-3 and which is connected to the OFF electrode 215, and the bit line 221-1 are equipped on the side where the memory cell M1 is placed.

The capacitor insulation film 215b-3 is formed simultaneously with the capacitor insulation film 216b-3 placed on the side where the above described ON capacitor 216b is placed and is made of, for example, tantalum pentoxide ($Ta_2O_5$) or zirconium dioxide ($ZrO_2$), or consists of a layered film constituted by a film made of tantalum pentoxide ($Ta_2O_5$) and that made of niobium pentoxide ($Nb_2O_5$) as described above.

Then, on the side where the memory cell M1 of the OFF electrode 215 is placed, the connecting state of the bit line 221-1, OFF capacitor 215b and OFF electrode 215 is controlled by way of the gate transistor 215c.

Here, the present embodiment is configured to set the forms of the components belonging to the first layer metal wiring layer ML1, i.e., the flat conductor pattern 221c and conductor pattern 221q, the components belonging to the second layer metal wiring layer ML2, i.e., lower capacitor plate 215b-1, conductor pattern 221e and conductor pattern 221n, the components belonging to the third layer metal wiring layer ML3, i.e., the conductor pattern 221g and conductor pattern 213e, and the components belonging to the fourth layer metal wiring layer ML4, i.e., modified plate line 232, conductor pattern 221j and conductor pattern 213c in such a manner as to overlap with one another when viewed from the thickness direction of the device as described below, thereby efficiently preventing the incident light 511 irradiated onto the mirror 212 from entering inside of the memory cell M1 or M2 and thusly preventing the memory cell M1 or M2 of the spatial light modulator 200 from malfunctioning due to an irradiation of the incident light 511. While the materials of all metal wiring layers may be arbitrarily selected, the commonly used material is aluminum or copper. As for the production method, a damascene process or the like may be applied.

Figure 7:
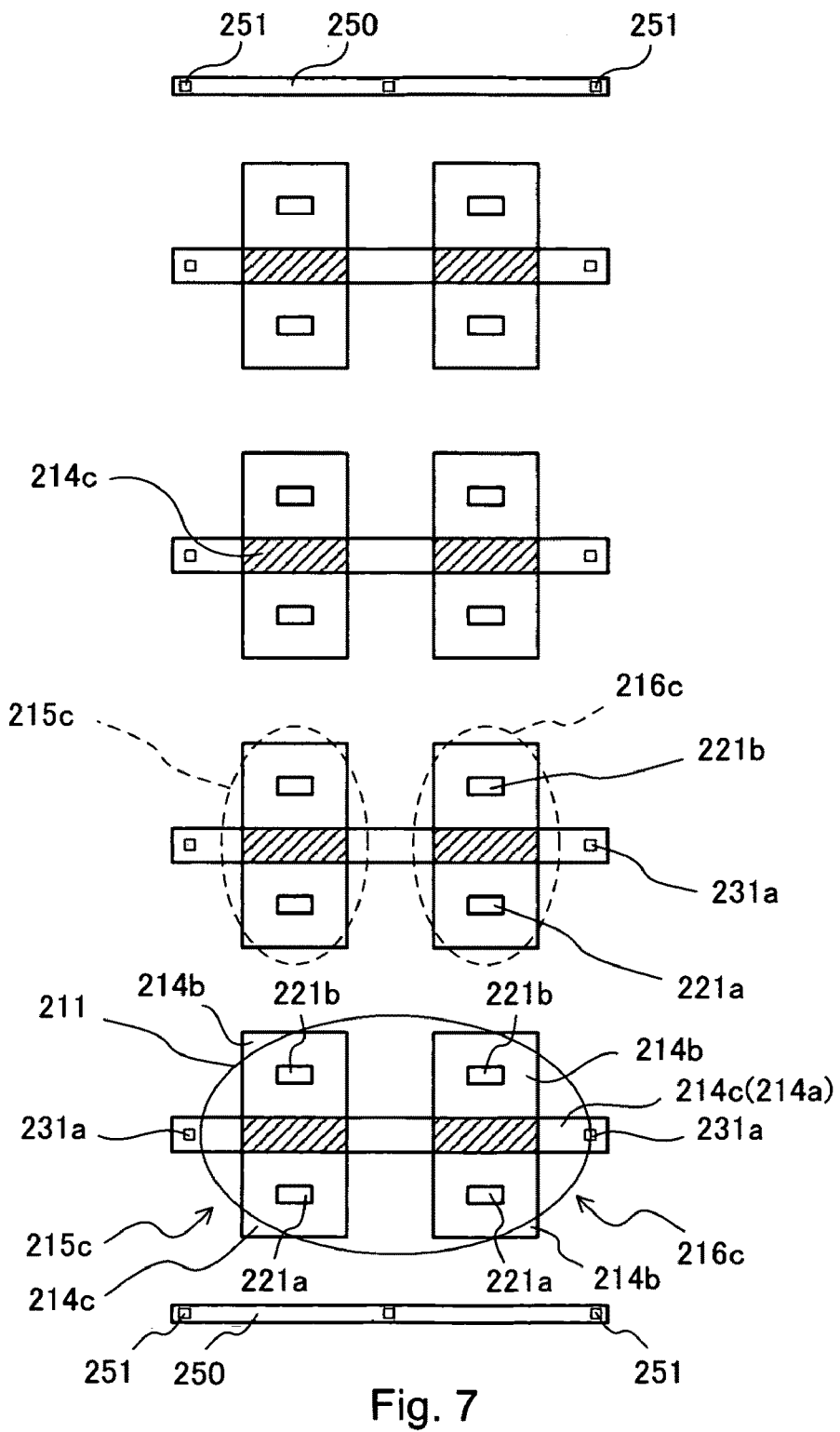
FIG. 7 is a plain view diagram showing an exemplary layout of the surface of the device substrate of a spatial light modulator according to a preferred embodiment of the present invention.

FIG. 7 is a plain view diagram showing an exemplary layout of a CMOS structure constituting the gate transistors 215c and 216c comprised in some pixel units 211 which are adjacent to each other in the direction of the bit line 221 of a spatial light modulator 200.

The present embodiment is configured to place substrate grounding unit 250 for every four pixels in the longitudinal direction (i.e., the vertical up/down direction of FIG. 7) of the bit line 221. The substrate grounding unit 250 is formed, simultaneously with the N-well 214b, on the surface of the substrate 214 by mean of a doping and is connected to an external ground potential.

In each pixel unit 211, the gate transistor 216c of the memory cell M2 and the gate transistor 215c memory cell M1 are parallel placed in a pair, with the gate oxidized film 214a and poly-silicon gate electrode 214c placed in such a manner as to traverse the respective centers of the aforementioned two transistors.

Further, the contact hole filler conductor 221a and contact hole filler conductor 221b are connected to the respective N-wells 214b that are placed with the poly-silicon gate electrode 214c sandwiched in between.

Placing the substrate grounding unit 250 for each transistor or capacitor will increase the area size. However, the present embodiment is configured to place the substrate grounding unit 250 for each minimum number of (i.e., for every four pixels in the case of the present embodiment) transistors that is required (i.e., the gate transistor 215c and gate transistor 216c) and capacitors (i.e., the OFF capacitor 215b and ON capacitor 216bc) that are placed above the aforementioned transistors as described above, and therefore it is possible to use the area size of the circuit forming region of the substrate 214 very effectively. In other words, it is possible to secure the largest possible layout area size of a transistor and capacitor. The higher the withstanding voltage of a transistor, the better for driving a mirror, requiring 10 volts or higher, or more preferably up to 20 volts if the layout area size can be secured.

Figure 8:
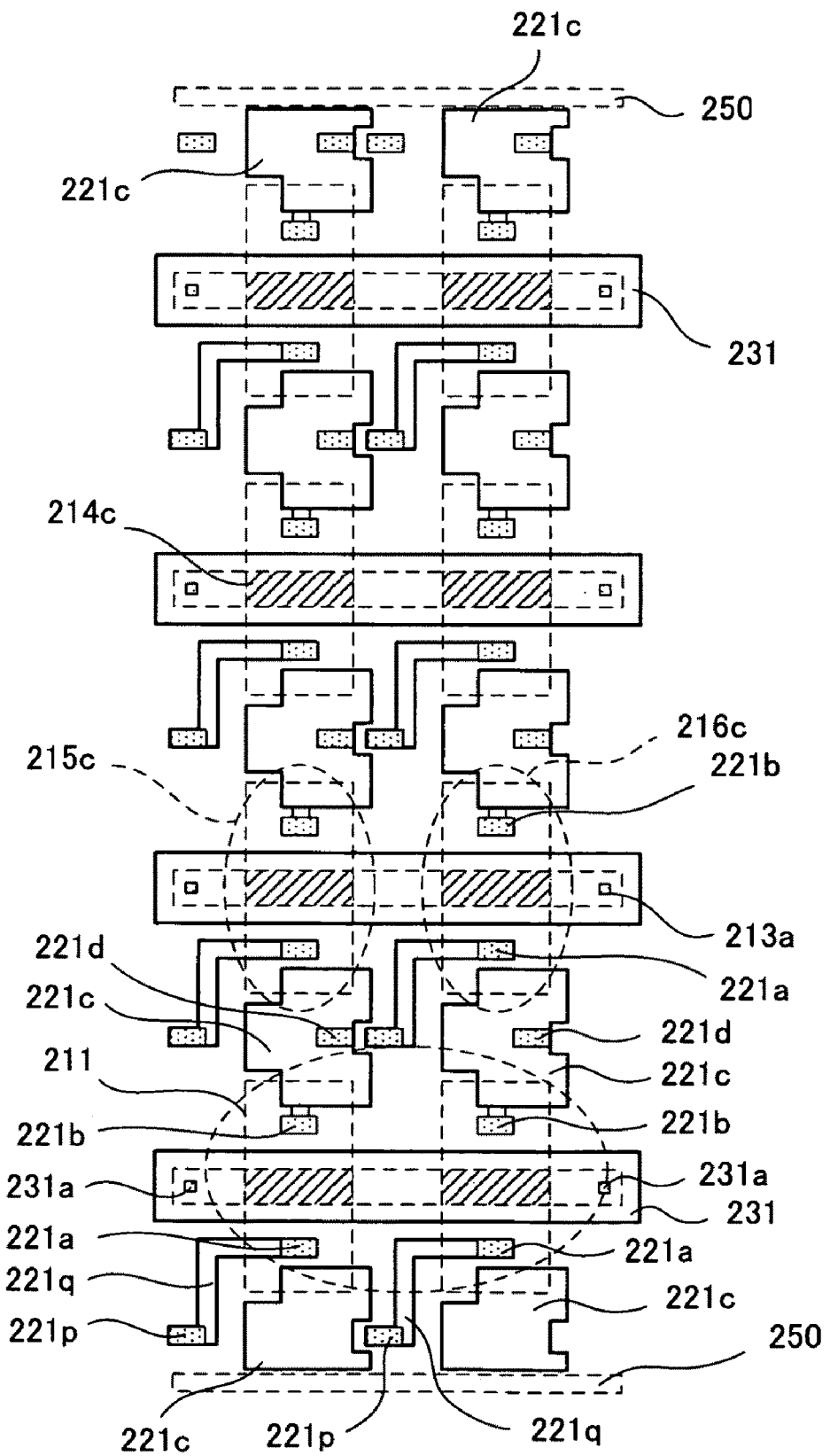
FIG. 8 is a plain view diagram showing an exemplary layout of the conductor pattern in a first layer metal wiring layer ML1 of a spatial light modulator according to a preferred embodiment of the present invention.

FIG. 8 is a plain view diagram showing an exemplary layout of the conductor pattern in the first layer metal wiring layer ML1.

As exemplified in FIG. 8, the word line 231, flat conductor pattern 221c and conductor pattern 221q are placed in the first layer metal wiring layer ML1.

The word line 231 is connected to the poly-silicon gate electrode 214c on the lower side by way of the contact hole filler conductor 231a.

The flat conductor pattern 221c is connected to the contact hole filler conductor 221b on the lower side and to the Via hole filler conductor 221d on the upper side.

The conductor pattern 221q is connected to the contact hole filler conductor 221a on the lower side and to the Via hole filler conductor 221p on the upper side.

The present embodiment is also configured such that the conductor pattern 221q connects the contact hole filler conductor 221a and Via hole filler conductor 221p together along the shortest distance obtained by combining straight lines that are parallel to the word line 231 and bit line 221.

In contrast, the flat conductor pattern 221c is formed in a flat form having a relatively larger area size so as to compensate for the respective narrow parts (i.e., the neck parts) of the lower capacitor plate 216b-1 and lower capacitor plate 215b-1 of the second layer metal wiring layer ML2 (which is described later).

Further, dummy flat conductor patterns 221c used for shielding light are placed at the end (in the viewpoint of FIG. 8) of the array (i.e., near to the substrate grounding unit 250).

Figure 9:
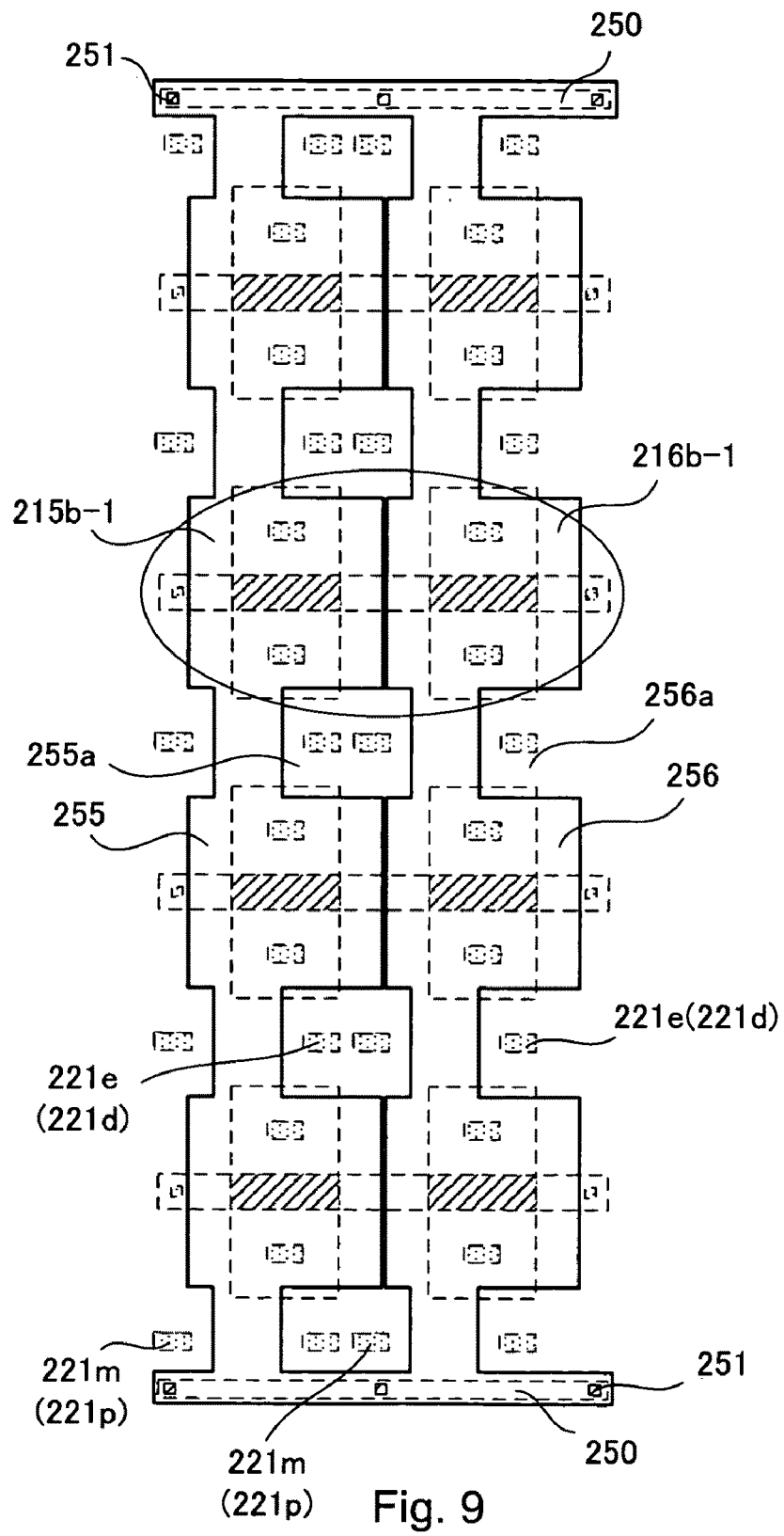
FIG. 9 is a plain view diagram showing an exemplary layout of the conductor pattern in a second layer metal wiring layer ML2 of a spatial light modulator according to a preferred embodiment of the present invention.

FIG. 9 is a plain view diagram showing an exemplary layout of the conductor pattern in the second layer metal wiring layer ML2.

The second layer metal wiring layer ML2 is equipped with ground pattern 256 and ground pattern 255, each of which is composed of continuous arrays of the lower capacitor plates 216b-1 and lower capacitor plates 215b-1, respectively, in the direction connecting to the substrate grounding units 250, and the both ends of the ground pattern 256 and the ground pattern 255 arrays are connected to the substrate grounding units 250 with Via hole filler conductors 251 intervening between them.

That is, the present embodiment is configured such that the ground pattern 256 and ground pattern 255 are also used as the lower capacitor plate 216b-1 (of the ON capacitor 216b) and lower capacitor plate 215b-1 (of the OFF capacitor 215b), respectively, in the second layer metal wiring layer ML2.

This configuration makes it possible to decrease the number of metal wiring layers when compared with a case of placing the lower capacitor plate 216b-1 and lower capacitor plate 215b-1 in a different layer from a layer that places the ground pattern 256 and ground pattern 255.

As a result, the miniaturization and lower cost of the spatial light modulator 200 can be attained.

Between the lower capacitor plates 216b-1, which are adjacent in the array direction, and between the lower capacitor plates 215b-1, which are also adjacent in the array direction, are narrow as indicated by pattern neck part 256a and pattern neck part 255a, whereas the above described flat conductor pattern 221c of the first layer metal wiring layer ML1 is formed as an approximate rectangle so as to compensate for the neck part when viewed in the layering direction.

Figure 10:
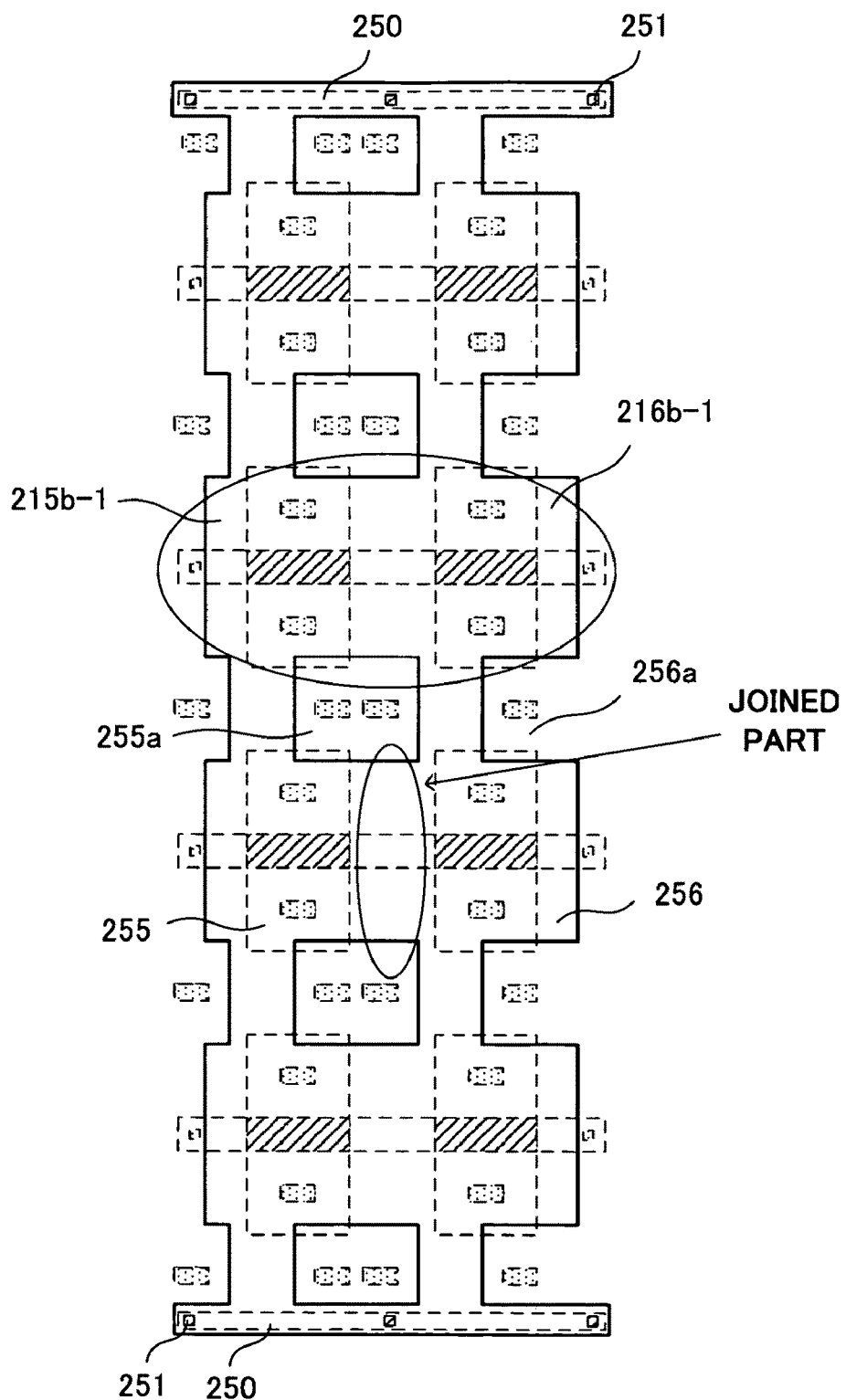
FIG. 10 is a plain view diagram showing an exemplary modification of the layout of the second layer metal wiring layer ML2 exemplified in FIG. 9.

FIG. 10 is a plain view diagram showing an exemplary modification of the layout of the second layer metal wiring layer ML2 exemplified in FIG. 9.

FIG. 10 exemplifies a case in which the lower capacitor plates 216b-1 (of the ground pattern 256) and lower capacitor plates 215b-i (of the ground pattern 255), both of which are serially arrayed in the direction connecting the substrate grounding unit 250, are arrayed without allowing a gap between the respective plates 216b-1 and 215b-1.

The respective ends of the arrays of the lower capacitor plate 216b-1 and lower capacitor plate 215b-i are connected to the substrate grounding unit 250 that is fundamentally at the same potential, and therefore the adjacent individual plates (i.e., the plates 216b-1; and plates 215b-1) may be placed integrally in the midst of the array without causing a problem. In the figure, although the ends of the ground patterns 256 and 255 seem to be cut off, they are actually connected to the neighboring ground patterns (in both of the horizontal directions).

Figure 11:
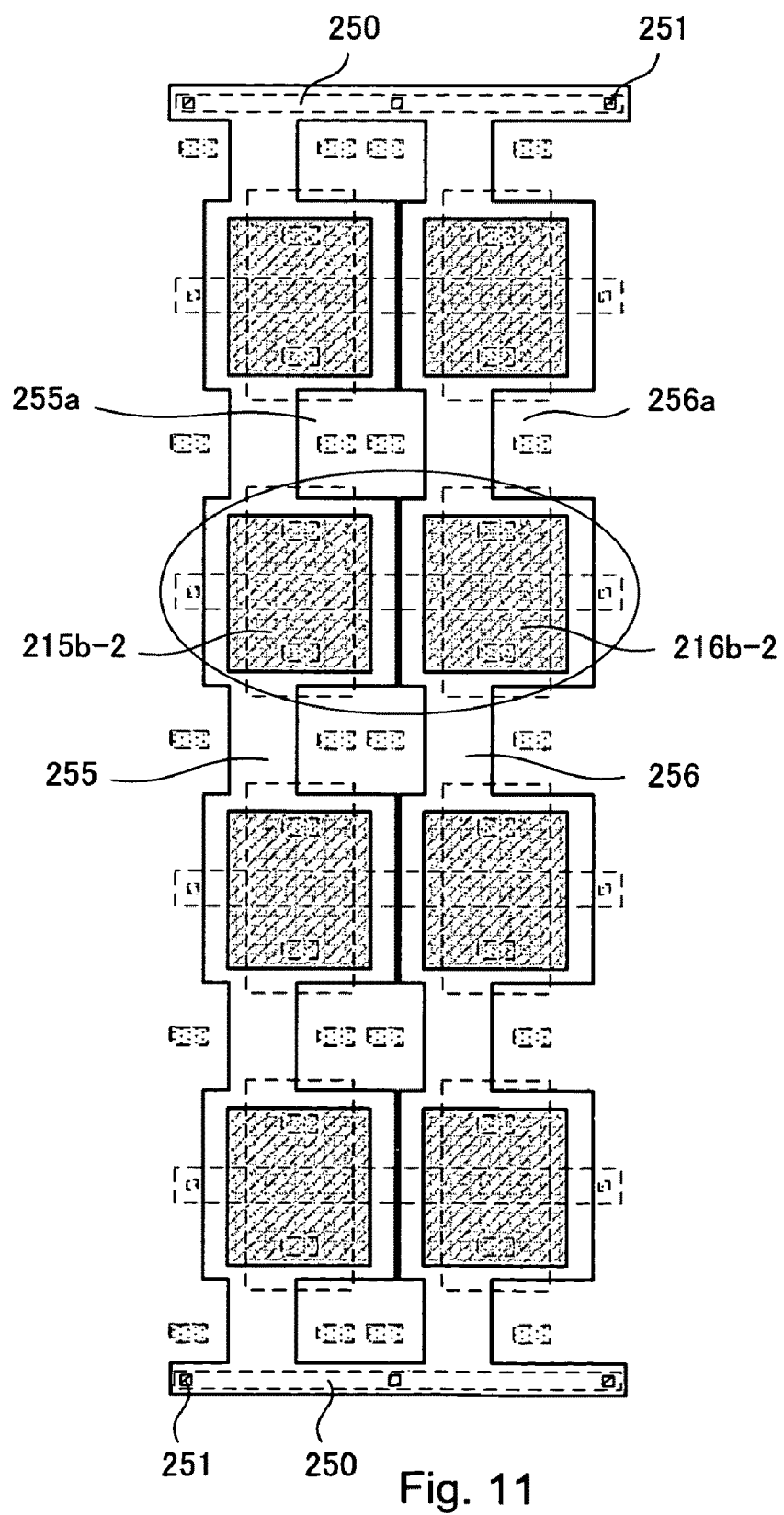
FIG. 11 is a plain view diagram showing an exemplary layout of the top plate of a capacitor comprised in a spatial light modulator according to a preferred embodiment of the present invention.

FIG. 11 is a plain view diagram showing an exemplary layout of the top plate of a capacitor.

The upper capacitor plate 216b-2 (of the ON capacitor 216b) and upper capacitor plate 215b-2 (of the OFF capacitor 215b), both of which are in rectangular forms, are respectively placed above the corresponding lower capacitor plates 216b-1 and lower capacitor plates 215b-1 with the capacitor insulation film 216b-3 and capacitor insulation film 215b-3 intervening between the respective upper and lower capacitor plates. The capacitance of the capacitors is preferably larger than 10 femto Farad (fF), and accordingly the present embodiment makes it possible to secure a necessary area size for the capacitor.

Figure 12:
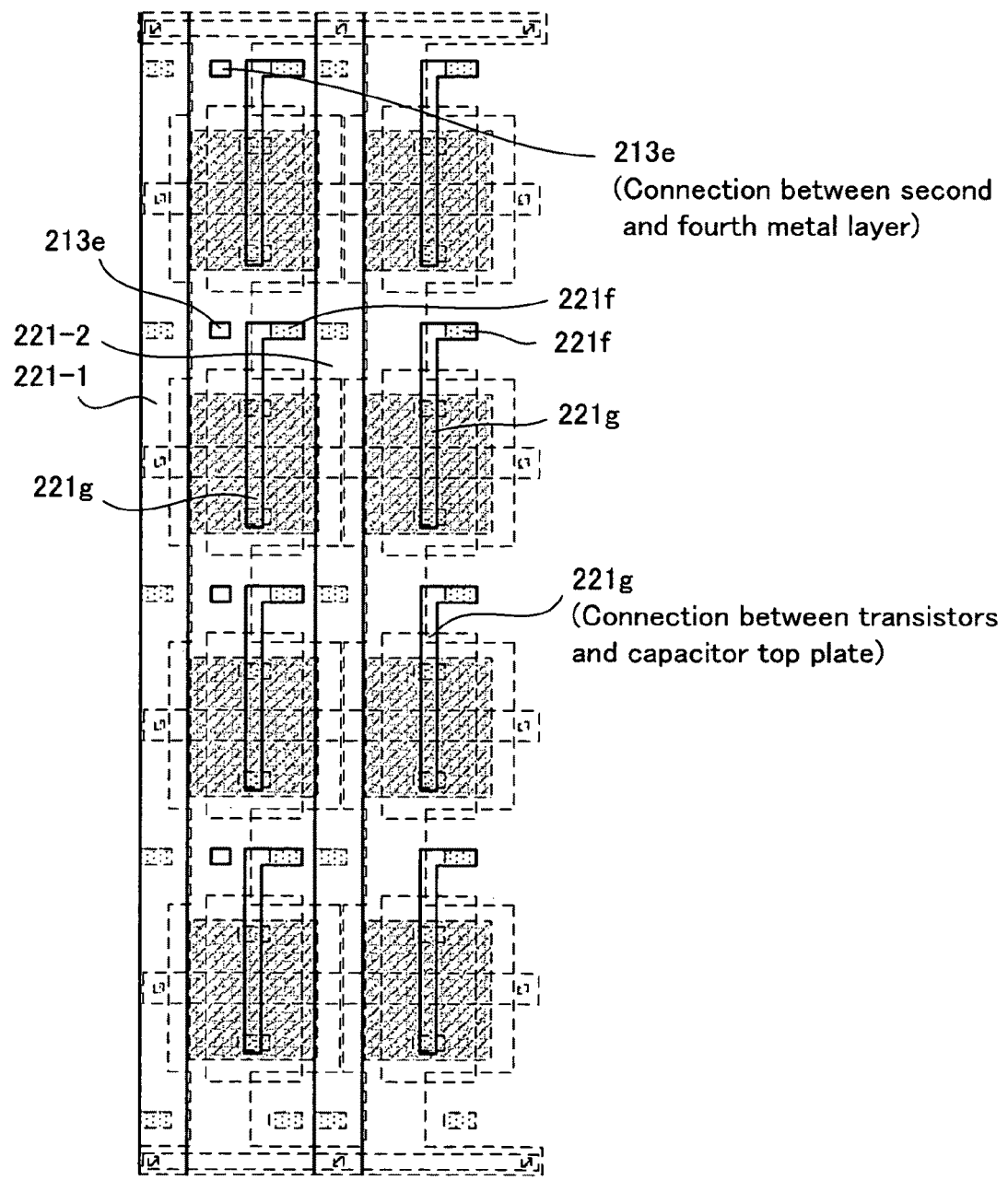
FIG. 12 is a plain view diagram showing an exemplary layout of the conductor pattern in a third layer metal wiring layer ML3 of a spatial light modulator according to a preferred embodiment of the present invention.

FIG. 12 is a plain view diagram showing an exemplary layout of the conductor pattern in the third layer metal wiring layer ML3.

The third layer metal wiring layer ML3 is equipped with the bit lines 221-1 and 221-2 in a pair and with the conductor pattern 221g and conductor pattern 213e.

The bit lines 221-1 and 221-2 are placed in a certain width and in such a manner as to not overlap with either of the upper capacitor plate 215b-2 and upper capacitor plate 216b-2, which are in the lower layer, in order to not generate an extraneous stray capacitance.

This configuration secures the respective area sizes of the upper capacitor plate 215b-2 and upper capacitor plate 216b-2 so as to place the OFF capacitor 215b and ON capacitor 216b effectively and to obtain the maximum possible capacitance thereof.

Further, the bit lines 221-1 and 221-2 are placed without overlapping with the OFF capacitor 215b and ON capacitor 216b, and therefore these capacitors are not influenced by the current flowing in the bit lines 221-1 and 221-2 when data is loaded onto the capacitors, and thereby it is possible to perform an accurate tilting operation of the mirror 212 by means of the electric charge accumulated in the OFF capacitor 215b and ON capacitor 216b.

Further, such a configuration makes it possible to further miniaturize a spatial light modulator 200.

The conductor pattern 221g is provided for connecting the upper capacitor plate 215b-2 and upper capacitor plate 216b-2 to the gate transistor 215c (of the memory cell M1) and gate transistor 216c (of the memory cell M2), respectively, while the conductor pattern 213e is provided for connecting together the second layer metal wiring layer ML and fourth layer metal wiring layer ML4.

Figure 13:
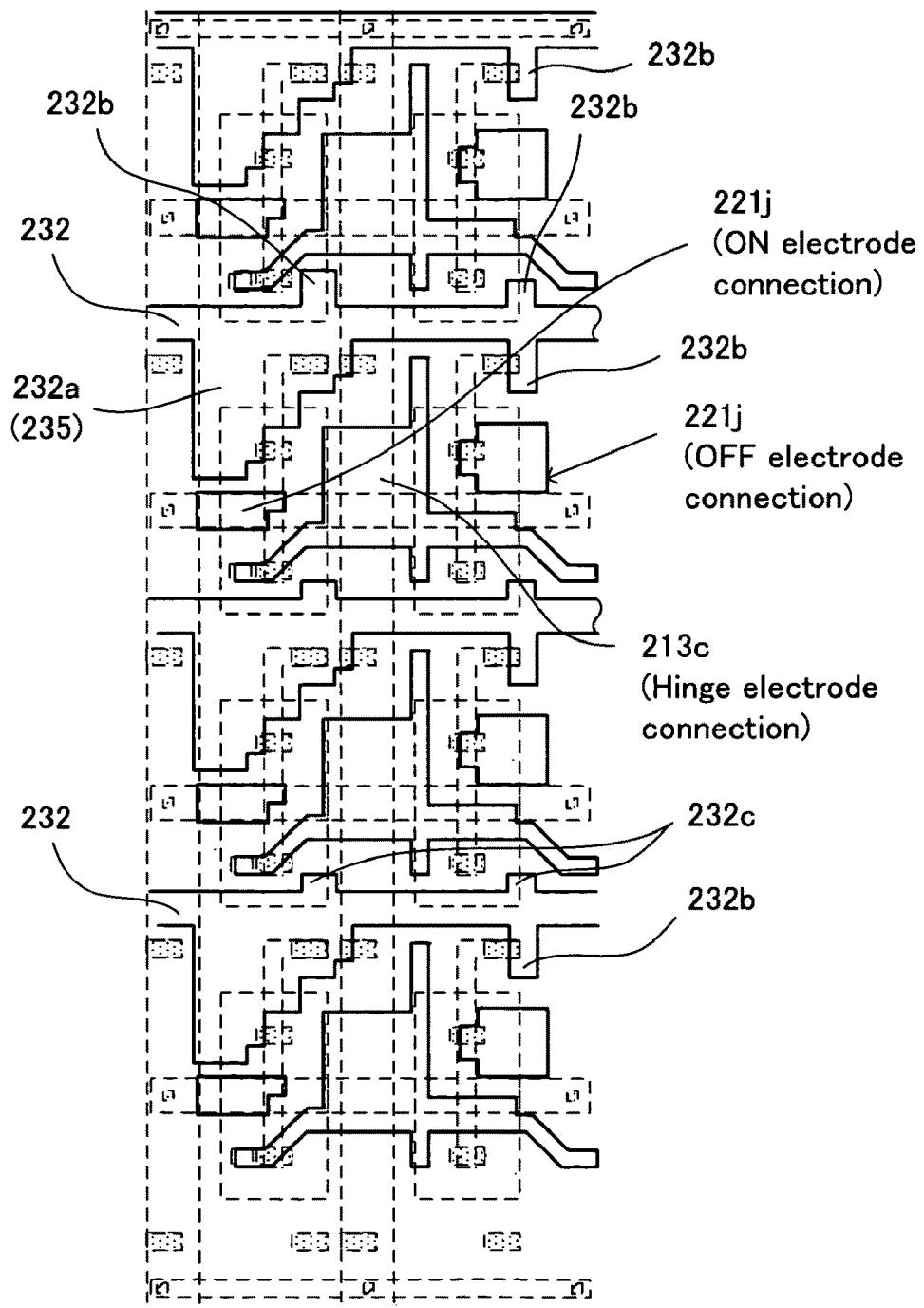
FIG. 13 is a plain view diagram showing an exemplary layout of the conductor pattern in a fourth layer metal wiring layer ML4 of a spatial light modulator according to a preferred embodiment of the present invention.

FIG. 13 is a plain view diagram showing an exemplary layout of the conductor pattern in the fourth layer metal wiring layer ML4.

The modified plate line 232, conductor pattern 213c and conductor patterns 221j on the ON and OFF sides are placed in the fourth layer metal wiring layer ML4.

In this case, the modified plate line 232 is equipped with a second ON electrode placement part 232a used for placing the second ON electrode 235 and, in addition, with branch parts 232b and 232c used for increasing the shielding effect.

The conductor pattern 213c is connected to the ground pattern 255 of the second layer metal wiring layer ML2 by way of the third layer metal wiring layer ML3.

Further, the conductor patterns 221j on the ON and OFF sides are connected to the conductor pattern 221g and conductor pattern 213e, respectively, of the third layer metal wiring layer ML3.

Figure 14:
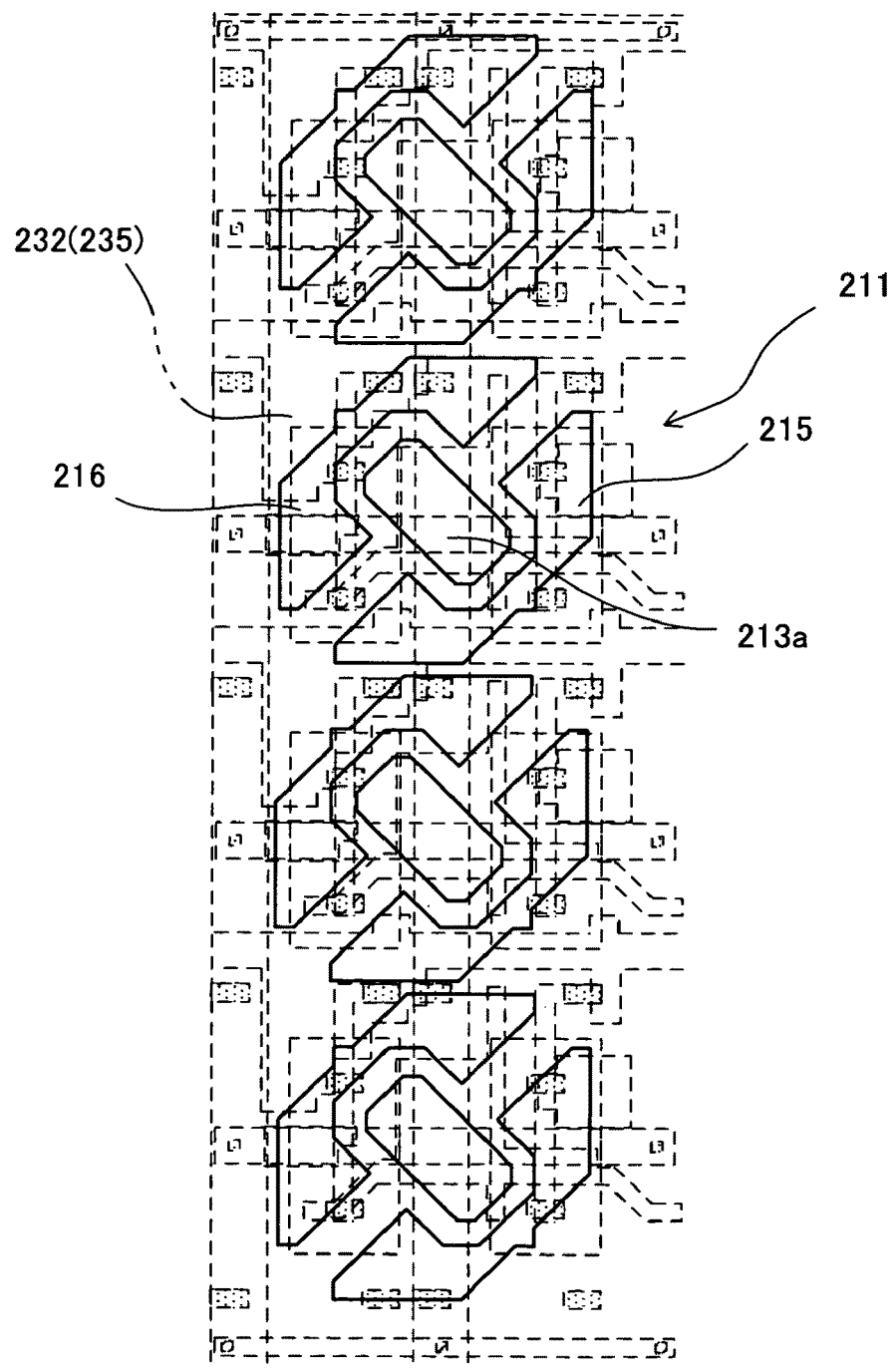
FIG. 14 is a plain view diagram showing an exemplary layout of the electrodes placed on the surface of a spatial light modulator according to a preferred embodiment of the present invention.

FIG. 14 is a plain view diagram showing an exemplary layout of the electrodes placed on the surface of the spatial light modulator 200.

In each pixel unit 211, the rectangular hinge electrode 213a having the center axis in the diagonal direction of the rectangular mirror 212 (not shown in this figure) is placed at the center, and the OFF electrode 215 and ON electrode 216 are placed so as to surround the hinge electrode 213a.

The hinge electrode 213a is connected to the conductor pattern 213c of the fourth layer metal wiring layer ML4, and the OFF electrode 215 and ON electrode 216 are together connected to the conductor pattern 221j of the fourth layer metal wiring layer ML4.

Next is a description of a light shielding effect of the modified plate line 232 comprising the flatly formed flat conductor pattern 221c (which is described above), branch parts 232b and 232c.

FIGS. 15A, 15B, 15C and 15D together show an example of placing a common circuit according to a reference technique in each of the first layer metal wiring layer ML1 and fourth layer metal wiring layer ML4 in one pixel unit.

Figure 15A:
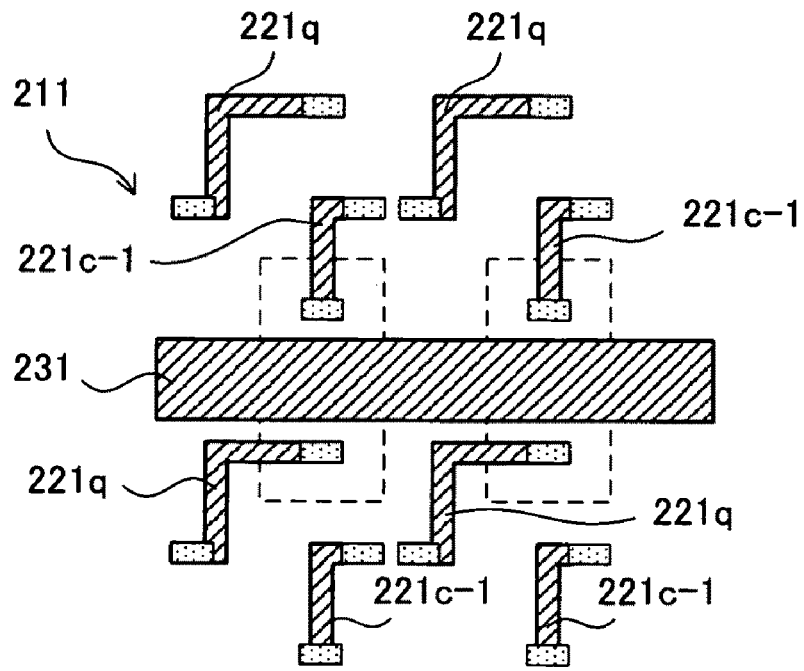
FIG. 15A is a plain view diagram showing the first layer metal wiring layer of one pixel unit of a spatial light modulator according to a reference technique of the present invention.

That is, FIG. 15A shows the case of placing, in the first layer metal wiring layer ML1, a commonly used fine line conductor pattern 221c-1, in place of the flat conductor pattern 221c according to the present embodiment.

Figure 15B:
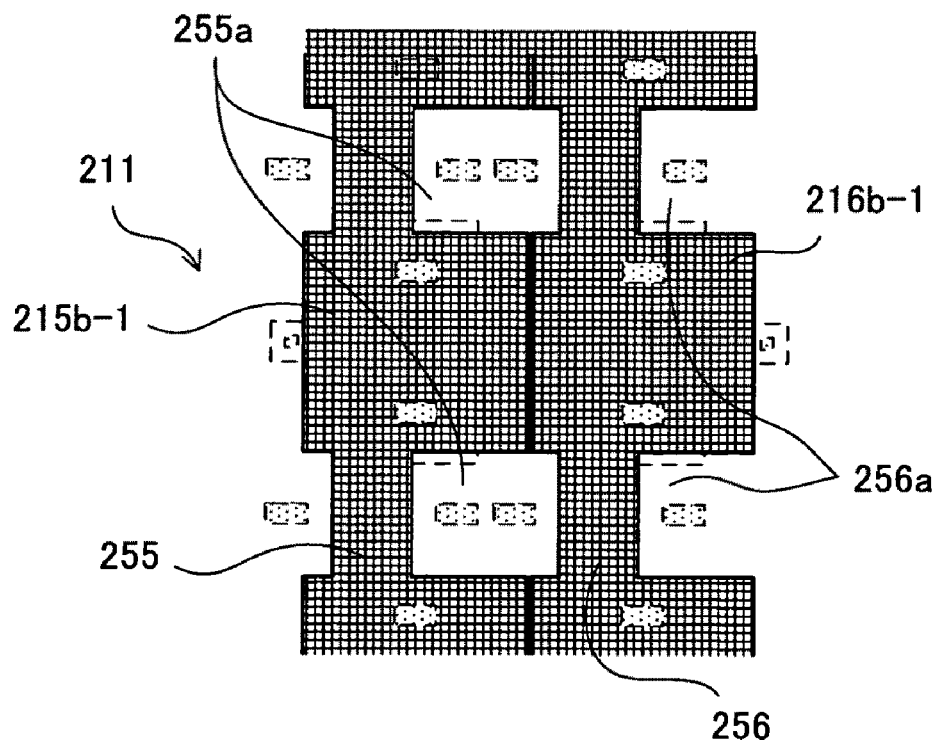
FIG. 15B is a plain view diagram showing the second layer metal wiring layer of one pixel unit of a spatial light modulator according to a reference technique of the present invention.
Figure 15C:
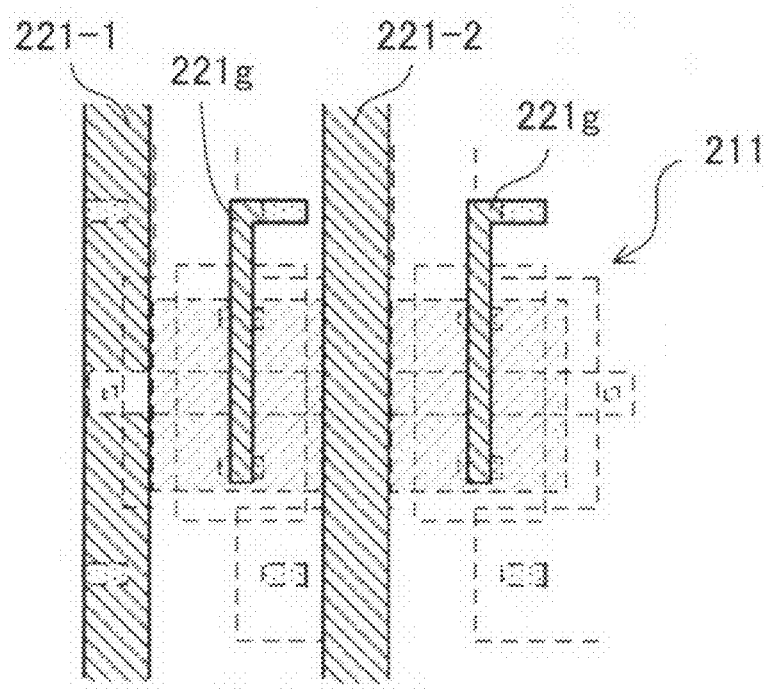
FIG. 15C is a plain view diagram showing the third layer metal wiring layer of one pixel unit of a spatial light modulator according to a reference technique of the present invention.

FIGS. 15B and 15C show the second layer metal wiring layer ML2 and third layer metal wiring layer ML3, respectively.

Figure 15D:
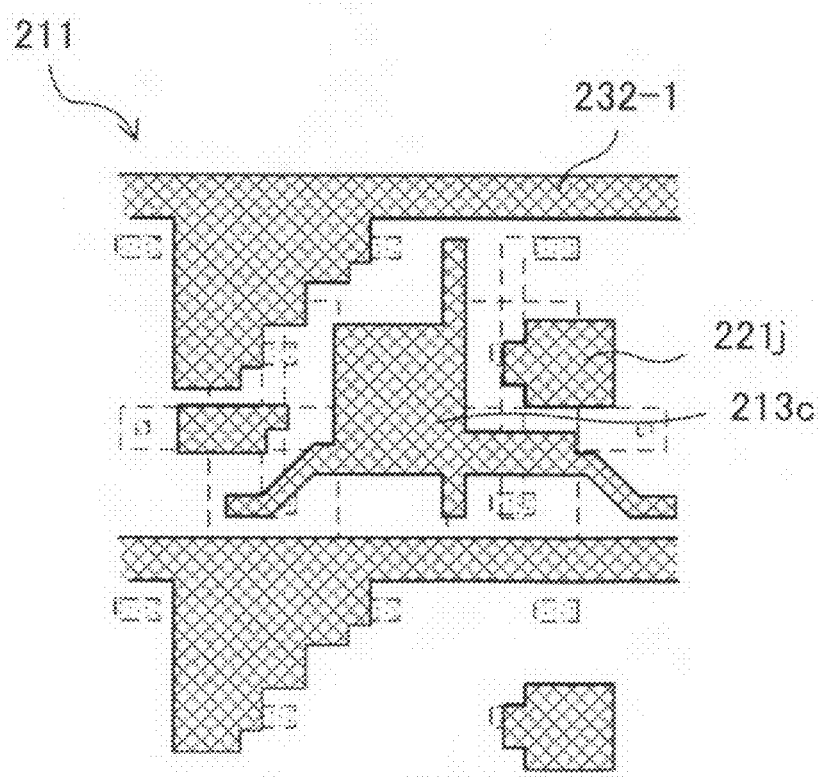
FIG. 15D is a plain view diagram showing the fourth layer metal wiring layer of one pixel unit of a spatial light modulator according to a reference technique of the present invention.

FIG. 15D shows the fourth layer metal wiring layer ML4 in the case of placing a commonly used simple plate line 232-1, as a reference technique, in place of using the modified plate line 232 comprising the branch part 232b according to the above described present embodiment.

Note that the figure shows different hatching for the respective wiring layers for easy comprehension of the effect of the overlapping state.

Figure 16:
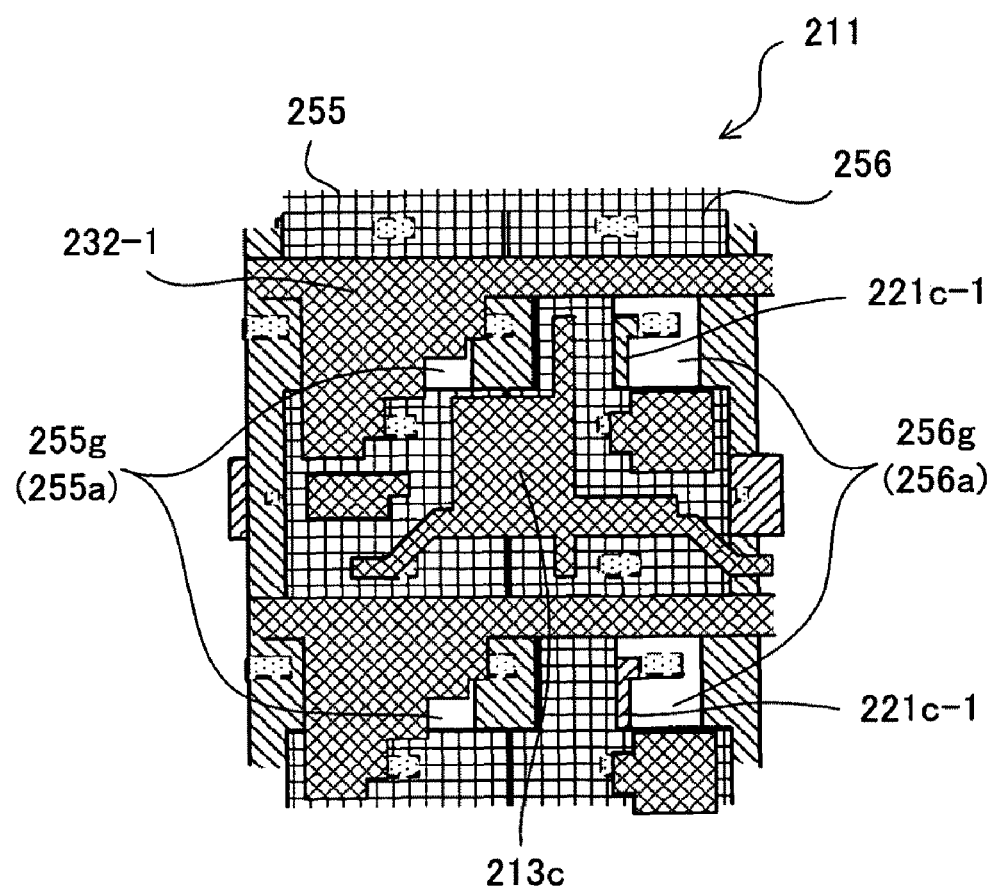
FIG. 16 is a plain view diagram showing the state obtained by overlapping the first layer metal wiring layer ML1 through the fourth layer metal wiring layer ML4 according to the reference technique shown in FIGS. 15A through 15D.

FIG. 16 is a plain view diagram showing the state of one pixel unit obtained by overlapping the first layer metal wiring layer ML1 through the fourth layer metal wiring layer ML4 according to the reference technique exemplified in the above described FIGS. 15A through 15D.

When viewed from the irradiating direction of the incident light 511, the pattern neck parts 255a and 256a of the ground patterns 255 and 256 are left as gaps 255g and 256g caused by the forms of the present pattern neck parts 255a and 256a of the ground patterns 255 and 256, respectively.

Then, the incident light 511 irradiates the gate transistor 215c and/or gate transistor 216c of the substrate 214 through the gaps 255g and 256g, constituting a cause for a malfunction of the spatial light modulator 200.

In contrast, the present embodiment is configured to use the flat conductor pattern 221c having a larger area size, in place of using the fine line conductor pattern 221c-1, and to place, instead of the simple plate line 232-1, the modified plate line 232 comprising the branch parts 232b and 232c as shown in the above described FIGS. 8 and 13, thereby closing the gap 255g of the above described pattern neck part 255a, making it possible to securely prevent the incident light 511 from entering the substrate 214.

This fact is described below with reference to FIGS. 17A, 17B, 17C and 17D and FIG. 18.

FIGS. 17A through 17D are plain view diagrams shown by extracting the respective layouts of the conductor patterns of one pixel unit 211 in the first layer metal wiring layer ML1 through fourth layer metal wiring layer ML4, according to the present embodiment, which respectively correspond to the above described FIGS. 15A through 15D.

Figure 17A:
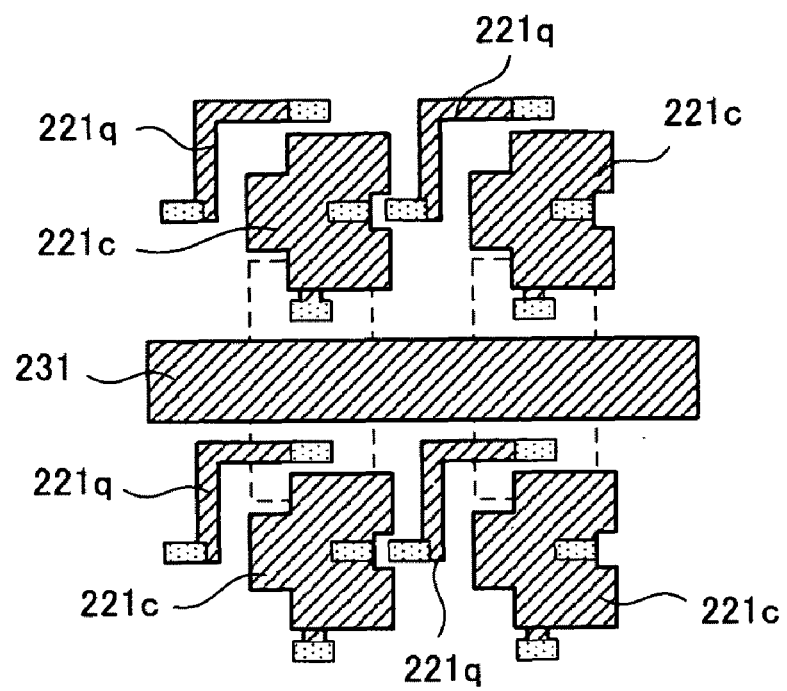
FIG. 17A is a plain view diagram showing one pixel unit of a spatial light modulator according to a preferred embodiment of the present invention, with the first layer metal wiring layer extracted.
Figure 17B:
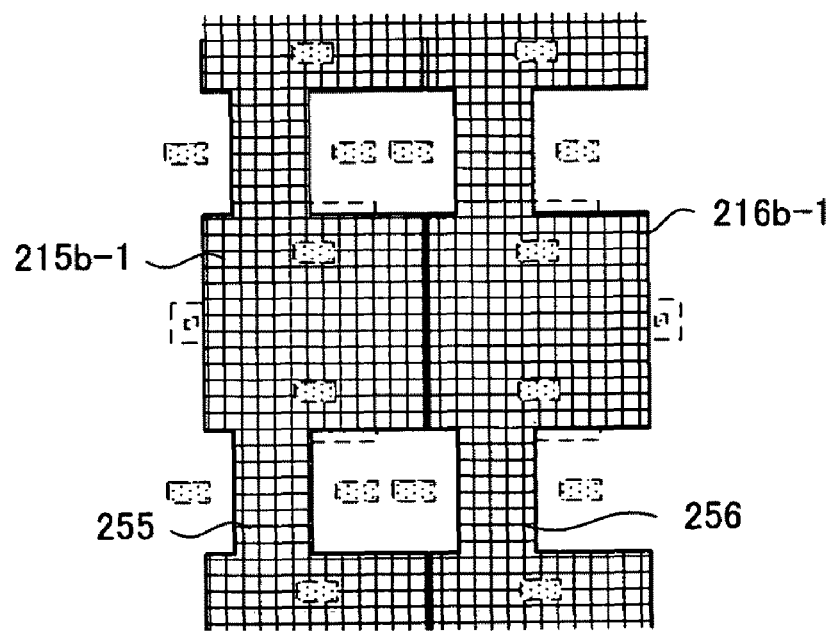
FIG. 17B is a plain view diagram showing one pixel unit of a spatial light modulator according to a preferred embodiment of the present invention, with the second layer metal wiring layer extracted.
Figure 17C:
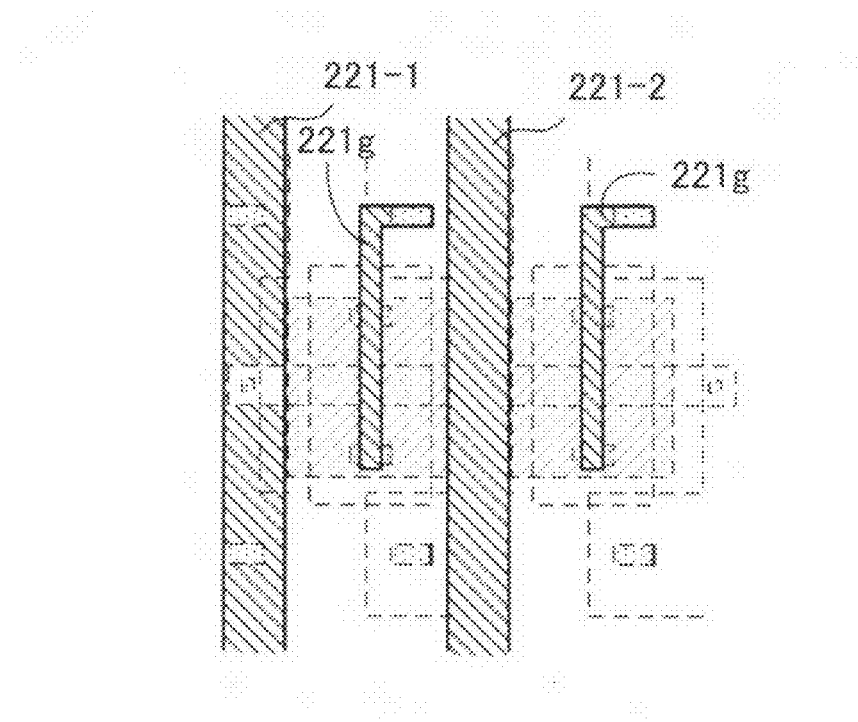
FIG. 17C is a plain view diagram showing one pixel unit of a spatial light modulator according to a preferred embodiment of the present invention, with the third layer metal wiring layer extracted.
Figure 17D:
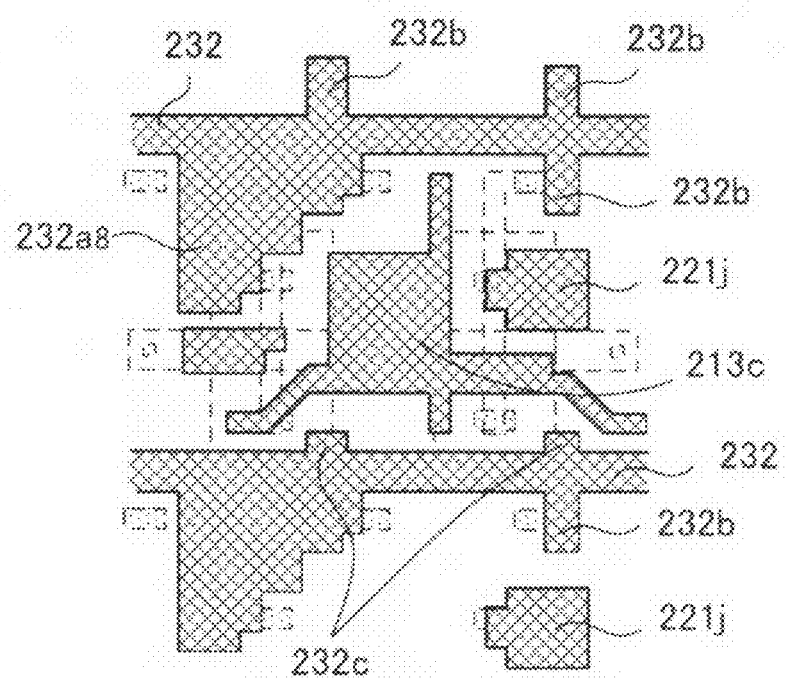
FIG. 17D is a plain view diagram showing one pixel unit of a spatial light modulator according to a preferred embodiment of the present invention, with the fourth layer metal wiring layer extracted.

This configuration differs from the above described reference technique where the flat conductor pattern 221c having a larger area size, instead of the fine line conductor pattern 221c-1, is placed in the first layer metal wiring layer ML1 shown in FIG. 17A, and the modified plate line 232 comprising the branch part 232b is equipped in the fourth layer metal wiring layer ML4 shown in FIG. 17D, in place of equipping the simple plate line 232-1.

Further, the area size (i.e., the length of extrusion) of the branch part 232b of each modified plate line 232 may be changed to the likes of the branch part 232c on an as required basis in terms of the layout or the like.

In the example of FIG. 17D, the branch parts 232c of the modified plate line 232 of the pixel unit 211 that is adjacent on the lower side is shorter than the branch parts 232b on the upper side. The reason is that the layout of the CMOS structure and the layout of the metal wiring layer are slightly shifted from the layout of the electrode and mirror because the substrate grounding unit 250 is provided for every four pixels.

Figure 18:
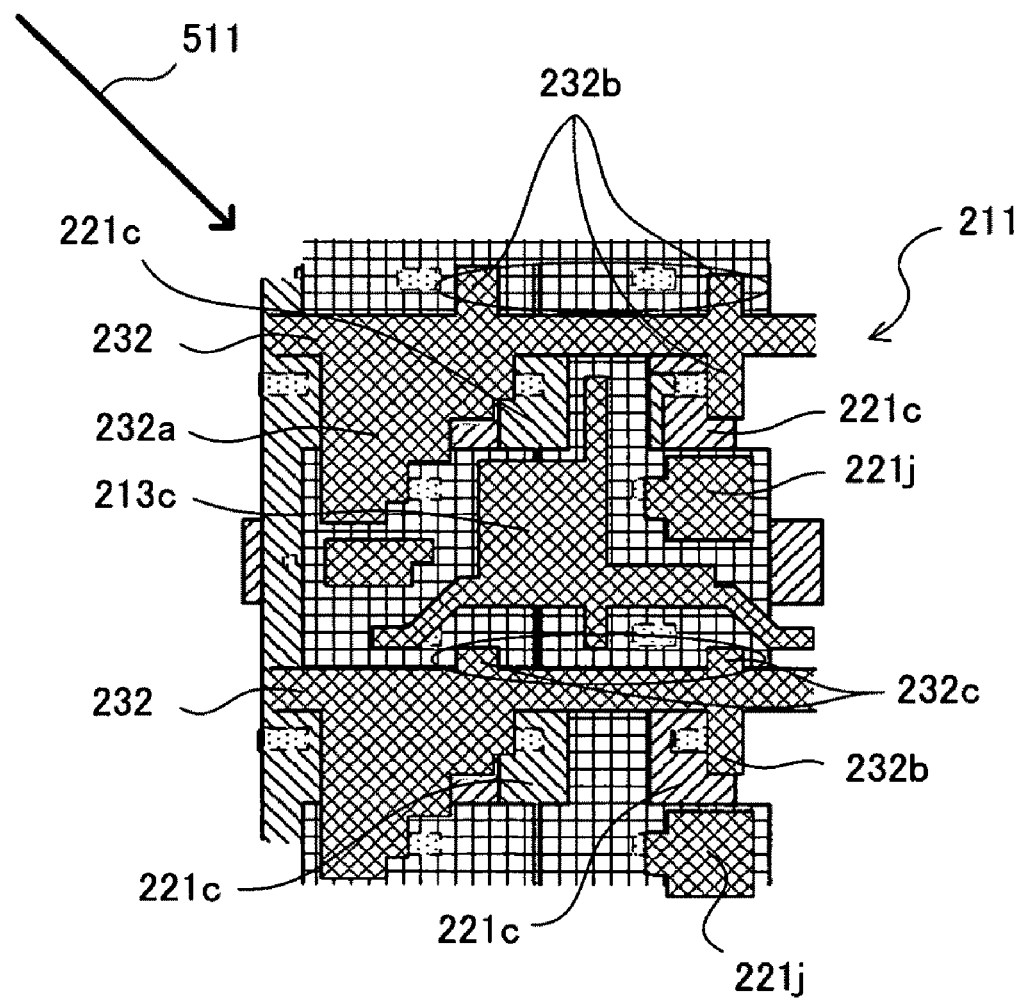
FIG. 18 is a plain view diagram showing one pixel unit resulting from overlapping the respective layers exemplified in FIGS. 17A through 17D.

FIG. 18 is a plain view diagram showing one pixel unit obtained by overlapping the respective layers exemplified in the above described FIGS. 17A through 17D.

As exemplified in FIG. 18, it is clearly comprehensible that there is no gap 256g of the pattern neck part 256a according to the reference technique shown in the above described FIG. 16 due to the presence of the wide flat conductor pattern 221c and the branch parts 232b and 232c of the modified plate line 232 and thereby the invasion of the incident light 511 into the substrate 214 is completely prevented.

That is, the present embodiment makes it possible to shield the invasion of the incident light 511 into the substrate 214 by placing the flat conductor pattern 221c and modified plate line 232, without a need to equip a specific use shield layer.

Further, in the case of the present embodiment, where the forms are changed are only the flat conductor pattern 221c in the first layer metal wiring layer ML1 and the modified plate line 232 in the fourth layer metal wiring layer ML4, and therefore a minimum change is required of the individual layers and an increase in the stray capacitance is prevented.

Particularly, the widths of wiring of long wirings such as the word line 231, bit line 221-1 and bit line 221-2 are maintained without a change, eliminating an influence of an increased stray capacitance and therefore no impediment is anticipated in the operation of the spatial light modulator 200.

Figure 19:
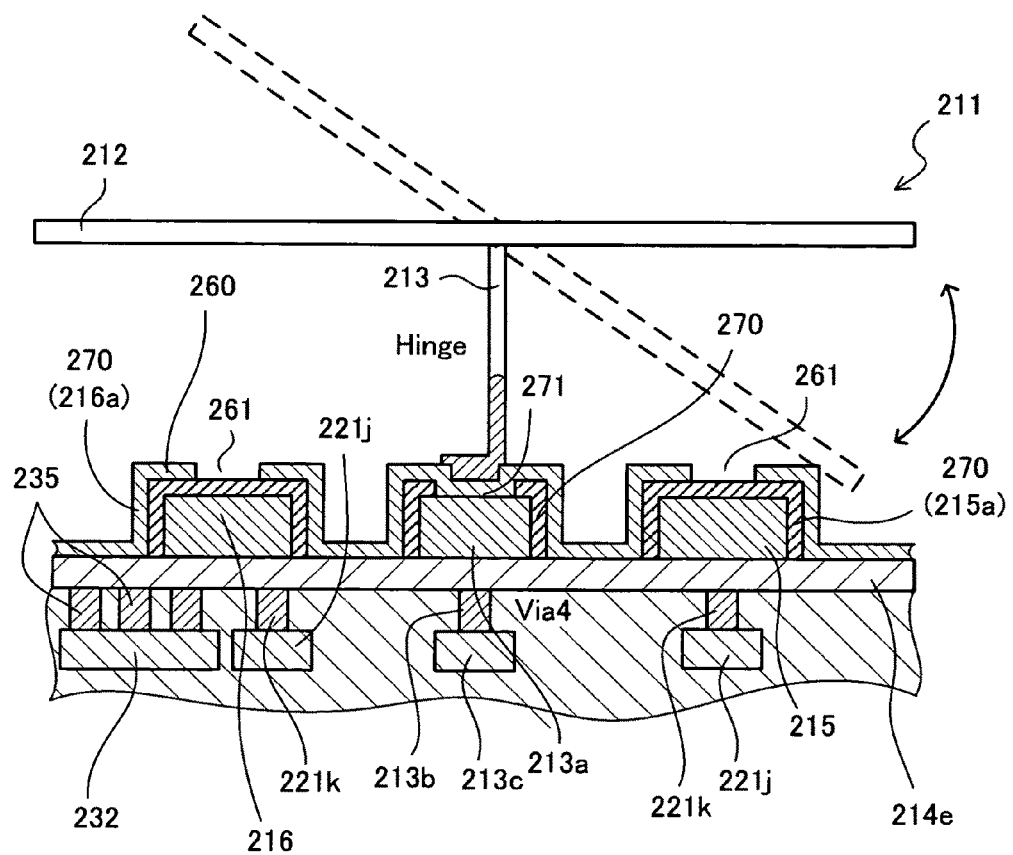
FIG. 19 is a cross-sectional diagram of one pixel unit of a plurality thereof constituting a spatial light modulator according to another preferred embodiment of the present invention.
Figure 20:
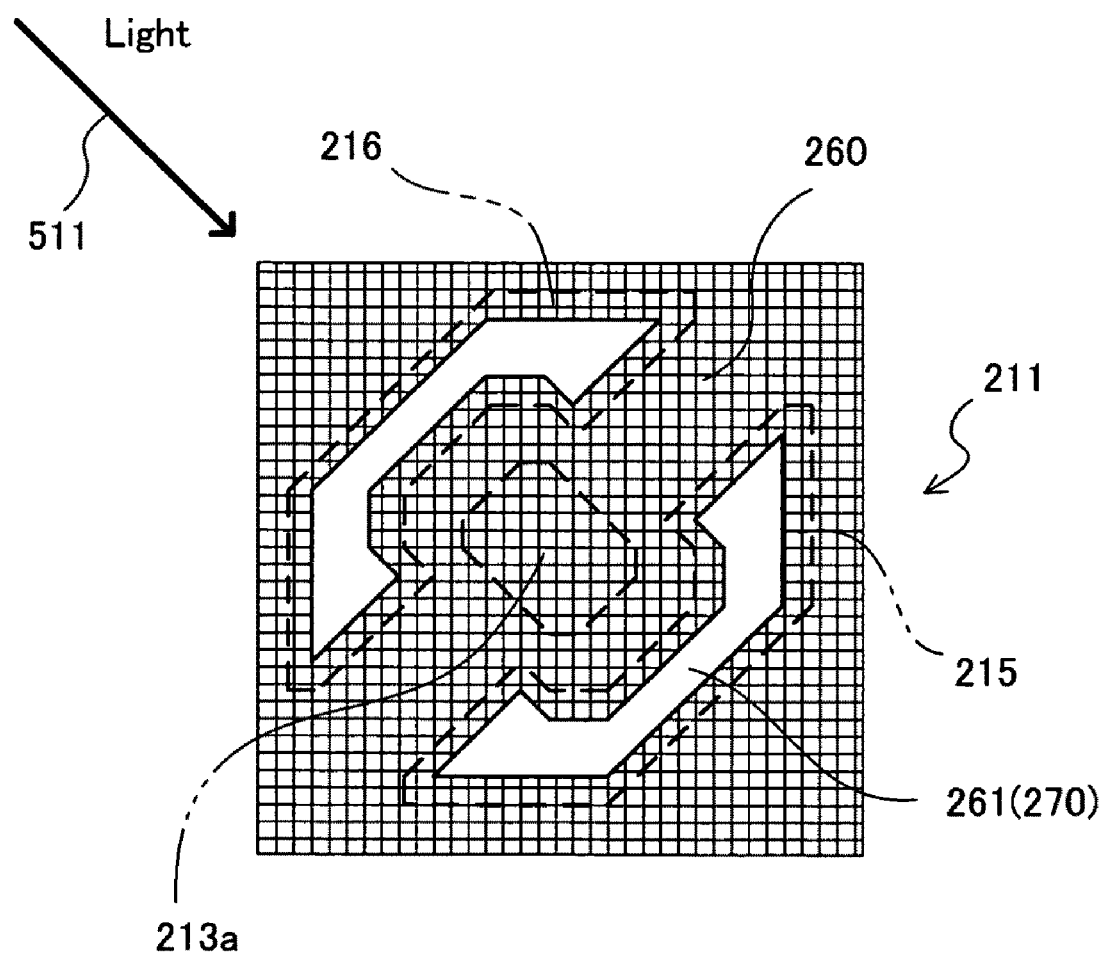
FIG. 20 is a plain view diagram of one pixel unit of a plurality thereof constituting a spatial light modulator according to another preferred embodiment of the present invention.

FIG. 19 is a cross-sectional diagram of one pixel unit of a plurality thereof constituting a spatial light modulator according to another preferred embodiment of the present invention; and FIG. 20 is a plain view diagram of the pixel unit.

The present embodiment is configured to form a barrier metal layer 260 possessing a light shielding property so as to cover the insulation film 214e, on which the OFF electrode 215, ON electrode 216 and hinge electrode 213a are placed.

Further, the OFF electrode 215, ON electrode 216 and hinge electrode 213a are covered with an insulative protection film 270, securing the insulation against the barrier metal layer 260.

The insulative protection film 270 of the OFF electrode 215 and ON electrode 216 also plays the function of OFF stopper 215a and ON stopper 216a and is effective to prevent stiction.

However, the insulative protection film 270 covering the hinge electrode 213a is equipped with an opening part 271, and the hinge electrode 213a is connected to the hinge electrode 213a on the lower side by way of the barrier metal layer 260 deposited on the opening part 271. A use of silicon or the like material as the material of the insulative protection film 270 provides an effectiveness of heat resistance.

Meanwhile, the barrier metal layer 260 may be made of tantalum, titanium or the like material.

Furthermore, in the barrier metal layer 260, a barrier metal opening part 261 is equipped in the region right above the OFF electrode 215 and ON electrode 216 and thereby it prevents the barrier metal layer 260 from attenuating the Coulomb force functioning from the OFF electrode 215 and ON electrode 216 to the mirror 212.

FIG. 20 shows the fact that the barrier metal opening part 261 is equipped in the regions right above the OFF electrode 215 and ON electrode 216 and that the barrier metal layer 260 is deposited on other regions.

Although the configuration (as exemplified in FIGS. 19 and 20) comprising the barrier metal layer 260 on the insulation film 214e provides benefit by itself, it may be combined with the light shielding structure comprising the above described flat conductor pattern 221c and modified plate line 232.

The spatial light modulator 200 according to the present embodiment exemplified in FIGS. 19 and 20 is configured to deposit the barrier metal layer 260 on the insulation film 214e on which the OFF electrode 215, ON electrode 216, hinge electrode 213a and the like, thereby making it possible to prevent the incident light 511, which is irradiated on the spatial light modulator 200 from the light source 510, from entering internally to the substrate 214.

Further, the configuration does not add an internal structure and therefore the spatial light modulator 200 can be miniaturized.

Further, the mirror 212 does not contact directly with the OFF electrode 215 or ON electrode 216, and therefore it is beneficial in preventing stiction where the mirror 212 sticks to the OFF electrode 215 or ON electrode 216.

Note, it shall be clear that the present invention may be modified and/or improved in various manners possible within the scope and spirit of the present invention, in lieu of being limited to the comprisal put forth in the above described embodiments.

The present invention enables the provision of a spatial light modulator capable of miniaturizing itself by reducing the number of layers of wiring and the area size of wiring by means of the effective use of the wiring, and further makes it possible to provide a low cost, compact and high performance display device comprising such spatial light modulator.

What is claimed is:

1. An image projection system implemented with a spatial light modulator for modulating an illumination light projected from a light source wherein said spatial light modulator having a plurality of modulating elements wherein each modulating element further comprising:
    at least two electrically conductive layers functioning as two different electrical wirings and said conductive layers having respectively a first and a second longitudinal directions overlapping and crossing each other; and
    a fixed electric potential layer electrically connected to a fixed electric potential, wherein the two different conductive layers and the fixed electric potential layer constituting multiple overlapping layers of flat plates each having irregular non-rectangular shapes for complimentarily to one another for covering an entire horizontal surface of the modulating element to totally block the illumination light emitted from the light source to enter into areas below a modulating surface of each of the modulating elements.

2. The image projection system according to claim 1, wherein:
    the electrically conductive layers and the fixed electric potential layer constituting said non-rectangular shapes having extended necks and plate areas with expanded width for complimentarily to one another for covering the entire horizontal surface of the modulating element.

3. The image projection system according to claim 1, wherein:
    the electrically conductive layers and the fixed electric potential layer constituting said non-rectangular shapes having extended necks and saw-tooth shaped plate areas for complimentarily to one another.

4. The image projection system according to claim 1, wherein:
    one of the electrically conductive layers constituting one of said electrical wiring as the flat surface plate extending along the first longitudinal direction to function as a word line.

5. The image projection system according to claim 1, wherein:
    one of the electrically conductive layers constituting one of said electrical wirings as the flat surface plate extending along the second longitudinal direction to function as a bit line.

6. The image projection system according to claim 1, wherein:
    the spatial light modulator is located at a position to receive the illumination light projected from the light source with an incidence angle larger than zero (0) degrees relative to the modulating surface.

7. The image projection system according to claim 1, wherein:
    the spatial light modulator is located at a position to receive the illumination light projected from the light source with an incidence angle smaller than thirty (30) degrees relative to the modulating surface.

8. The image projection system according to claim 1, wherein:
    one of the electrically conductive layers constituting one of the flat surface plates functioning as a conductive plate of a capacitor.

9. The image projection system according to claim 1, wherein:
    at least one of the electrically conductive layers is electrically connected to a fixed electric potential.

10. The image projection system according to claim 1, wherein:
    the fixed electric potential layer is electrically connected to a device ground potential.

11. The image projection system according to claim 1, wherein:
    the spatial light modulator further comprises a mirror device wherein each of the modulating elements comprising a deflectable mirror supported by a hinge to function as the modulating surface to reflect the illumination light emitted from the light source.

12. The image projection system according to claim 11, wherein:
    the light source projecting the illumination light to said spatial light modulator with an incidence angle approximately two times of a maximum deflectable angle of the mirror relative to a top surface across the mirrors in the plurality of modulating elements.

13. An image projection system implemented with a spatial light modulator for modulating an illumination light projected from a light source wherein said spatial light modulator having a plurality of modulating elements wherein each modulating element further comprising:
    at least two electrically conductive layers functioning as two different electrical wirings and said conductive layers constituting overlapping layers of flat plates each having irregular non-rectangular shapes for complimentarily to one another for covering an entire horizontal surface of the modulating element and extending respectively along a first and a second longitudinal directions overlapping and crossing each other; and
    one of the two different electrically conductive layers functioning as a conductive plate of a capacitor and the two different electrically conductive layers further totally block the illumination light emitted from the light source to enter into areas below a modulating surface of each of the modulating elements.

14. The image projection system according to claim 13, wherein:
    one of the two different electrically conductive layers constituting one of said electrical wiring as the flat surface plate extending along the first longitudinal direction to function as a word line.

15. The image projection system according to claim 13, wherein:
    one of the two different electrically conductive layers constituting one of said electrical wiring as the flat surface plate extending along the second longitudinal direction to function as a bit line.

16. The image projection system according to claim 13, wherein:
    at least one of the electrically conductive layers is electrically connected to a fixed electric potential.

17. The image projection system according to claim 13, wherein:
    at least one of the two conductively layers is electrically connected to a device ground potential.

18. The image projection system according to claim 13, wherein:
the capacitor is a metal-insulator-metal (MIM) capacitor further includes an insulation film disposed immediately next to one of the two electrically conductive layers.

19. The spatial light modulator according to claim 13, wherein:
one of the two different electrically conductive layers functioning as said conductive plate of the capacitor disposed at a lower portion of the capacitor.

20. The spatial light modulator according to claim 13, wherein:
one of the two different electrically conductive layers functioning as said conductive plate of the capacitor disposed at a upper portion of the capacitor.

21. The spatial light modulator according to claim 18, wherein:
the insulation film of the capacitor is composed of a tantalum pentoxide ($Ta_2O_5$).

22. The spatial light modulator according to claim 18, wherein:
the insulation film of the capacitor is composed of a zirconium dioxide ($ZrO_2$).

23. An image projection system implemented with a spatial light modulator for modulating an illumination light projected from a light source wherein said spatial light modulator comprising:
at least two electrically conductive layers functioning as two different electrical wirings and said conductive layers having respectively a first and a second longitudinal directions overlapping and crossing each other; and
one of the two different electrically conductive layers functioning as a conductive plate of a capacitor and the two different electrically conductive layers are overlapped with one another; and
the capacitor has a metal-insulator-metal (MIM) structure further includes an insulation film disposed immediately next to one of the two electrically conductive layers wherein the insulation film of the capacitor further comprises a layered film of a first layer of a tantalum pentoxide ($Ta_2O_5$) and a second layer of a niobium pentoxide ($Nb_2O_5$).

* * * * *